United States Patent [19]

Hara et al.

[11] Patent Number: 5,726,435
[45] Date of Patent: Mar. 10, 1998

[54] OPTICALLY READABLE TWO-DIMENSIONAL CODE AND METHOD AND APPARATUS USING THE SAME

[75] Inventors: Masahiro Hara, Nagoya; Motoaki Watabe, Toyokawa; Tadao Nojiri, Oobu; Takayuki Nagaya, Nagoya; Yuji Uchiyama, Aichi-ken, all of Japan

[73] Assignees: Nippondenso Co., Ltd., Kariya; Kabushiki Kaisha Toyota Chuo Kenkyusho, Aichi-ken, both of Japan

[21] Appl. No.: 403,548

[22] Filed: Mar. 14, 1995

[51] Int. Cl.⁶ .................. G06K 19/06; G06K 7/10
[52] U.S. Cl. ........................... 235/294; 235/462
[58] Field of Search .................. 235/456, 454, 235/494, 460, 470, 465; 250/566; 382/56

[56] References Cited

U.S. PATENT DOCUMENTS

| | | | |
|---|---|---|---|
| 4,263,504 | 4/1981 | Thomas | 235/454 |
| 4,528,444 | 7/1985 | Hara et al. | 235/462 |
| 4,736,109 | 4/1988 | Dvorzsak | 235/494 X |
| 4,896,029 | 1/1990 | Chandler et al. | 235/494 |
| 4,924,078 | 5/1990 | Sant'Anselmo et al. | 235/494 |
| 4,939,354 | 7/1990 | Priddy et al. | 235/456 |
| 4,958,064 | 9/1990 | Kirkpatrick | 235/462 X |
| 5,053,609 | 10/1991 | Priddy et al. | 235/436 |
| 5,124,536 | 6/1992 | Priddy et al. | 235/432 |
| 5,126,542 | 6/1992 | Priddy et al. | 235/456 |
| 5,189,292 | 2/1993 | Batterman et al. | 235/494 |
| 5,202,552 | 4/1993 | Little et al. | 235/494 |
| 5,204,515 | 4/1993 | Yoshida | 235/494 X |
| 5,288,986 | 2/1994 | Pine et al. | 235/494 |
| 5,296,693 | 3/1994 | Hughes-Hartogs | 235/494 |
| 5,324,923 | 6/1994 | Cymbalski et al. | 235/494 |
| 5,343,031 | 8/1994 | Yoshida | 235/494 |
| 5,410,620 | 4/1995 | Yoshida | 235/494 |
| 5,464,974 | 11/1995 | Priddy et al. | 235/494 |

FOREIGN PATENT DOCUMENTS

| | | | |
|---|---|---|---|
| 0561334 | 9/1993 | European Pat. Off. | 235/494 |
| 0564708 | 10/1993 | European Pat. Off. | 235/494 |
| 212579 | 1/1990 | Japan | 235/494 |
| 338791 | 2/1991 | Japan | 235/494 |
| 4157587 | 5/1992 | Japan | 235/494 |
| 61-72371 | 4/1996 | Japan . | |

*Primary Examiner*—Donald T. Hajec
*Assistant Examiner*—Thien Minh Le
*Attorney, Agent, or Firm*—Cushman, Darby & Cushman IP Group of Pillsbury Madison & Sutro LLP

[57] ABSTRACT

A two-dimensional code 1 consists of three positioning symbols 2, a data region 3, timing cells 4 and an apex detecting cell 5. The shape of the whole code 1 is a square having the same number of vertical and lateral cells. A scanning line passing through the center of each positioning symbols 2 always gives a constant frequency component ratio—dark:light:dark:light:dark=1:1:3:1:1, irrespective of the scanning direction. For this reason, even if a rotational angle of the two-dimensional code is not certain, the specific frequency component ratio of each positioning symbol 2 can be easily detected by executing only one scanning operation in a predetermined direction. Hence, the coordinates of the center of each positioning symbols 2 can be easily found. Thus, the position of the two-dimensional code 1 is quickly identified.

61 Claims, 13 Drawing Sheets

| 66 | | | |
|---|---|---|---|
| $b_0$ | $b_1$ | $b_2$ | $b_3$ |
| $b_4$ | $b_5$ | $b_6$ | $b_7$ |
| $b_7$ | $b_6$ | $b_5$ | $b_4$ |
| $b_3$ | $b_2$ | $b_1$ | $b_0$ |

67

| 69 | | | |
|---|---|---|---|
| $b_0$ | $b_1$ | $b_2$ | $b_5$ |
| $b_3$ | $b_4$ | $b_4$ | $b_3$ |
| $b_5$ | $b_2$ | $b_1$ | $b_0$ |

70

OPTICALLY READABLE TWO-DIMENSIONAL CODE AND METHOD AND APPARATUS USING THE SAME

BACKGROUND OF THE INVENTION

1. Field of the Invention

This invention relates to an optically readable code for inputting information into a computer or the like, and more particularly to an optically readable two-dimensional code including cells representing binary-coded data and placed on a two-dimensional matrix so as to form a binary-coded pattern.

2. Related Art

A generally known method of reading a two-dimensional code includes steps of taking in an image of the two-dimensional code by means of an image input device, such as a TV camera, and then detecting the position of the concerned two-dimensional code to read out content of the code. Subsequently, the size of the code matrix is obtained based upon the two-dimensional code thus read out, and the coordinates of data cells in the code matrix are successively obtained. Then, a judgement is made as to whether each data cell is "0" or "1" (i.e. light or dark), thus converting each of the data cells into character information.

Such a two-dimensional code is generally advantageous, when it is compared with a bar code, in that a large amount of CD information can be stored in a relatively smaller area.

To realize high accuracy in the reading operation of such two-dimensional codes, conventional technologies have been adopting encoding theories using various encoding technologies, such as an error detecting encoding operation and an error-correcting encoding operation. However, it should be pointed out that the present-day advancement of a reading operation of this kind of two-dimensional codes is still at a level that must rely on software processing executed by a high-performance CPU, as described later. Thus, there is room for improvement regarding the speed at which two-dimensional codes are read.

One problem is that the two-dimensional code itself has a code arrangement unsuitable for a fast reading operation. In addition, this code arrangement is not suitable for the processing required to handle the rotation of the two-dimensional code.

For example, Japanese Patent Application No. 12579/1990, which is a counterpart application of U.S. Pat. No. 4,939,354, discloses a matrix having two solid sides consisting of consecutively arrayed dark (black) squares only and another two dotted sides consisting of alternately arrayed light (white) and dark squares. Detection is performed by discriminating each of these four sides based on their characteristic line profile and then determining an orientation of the matrix. However, in determining its position and its rotational angle, it is necessary to scan the image of the matrix so extensively from every direction that all the characteristic patterns of these four sides are completely recognized.

Furthermore, an image of the matrix is not always constant in size, thus an error may occur in the detection of a cell when the position of the cell is predicted according to a predetermined interval. Still further, when light squares or dark squares are arrayed consecutively and extensively, some reading methods will possibly result in erroneous detection. According to U.S. Pat. No. 4,939,354, two dotted sides are disclosed consisting of alternately arrayed light and dark squares. Therefore, all that needs to be done is to determine the orientation of the code matrix, thus letting us accurately predict the positions of all the cells based upon the positions of light and dark squares of these two dotted sides, assuring an accurate reading operation. However, using a large amount of cells only for determining the position of each cell is not desirable since the number of the remaining cells available in the matrix for representing other information is reduced accordingly.

Moreover, the matrix disclosed in U.S. Pat. No. 4,939,354 uses a series of linearly arrayed binary-coded cells for representing one character. Such a cell arrangement is disadvantageous in that them is the possibility that numerous amounts of data may become unreadable due to the presence of a stain (spot or void).

Furthermore, there is a possibility that exactly the same pattern as that of the characteristic four peripheral sides may happen to occur within the data area. This will necessitate complicated processing for the reading operation. Accordingly, such a complicated reading operation will require a significantly long time to complete.

In general, compared with bar codes, two-dimensional codes allow us to deal with a large amount of data. This means that two-dimensional codes require a fairly long time to decode the data. In addition, as suggested in the above-described problem, a long period of time is required in a reading-out operation for picking up two-dimensional codes only from the image data taken in. Yet further, one of other factors taking a long period of time is decode preprocessing which includes rotational angle detection and coordinate conversion processing, both of which are mandatory when each two-dimensional code is randomly placed with an uncertain rotational angle with respect to a reading device. Still further, the two-dimensional codes themselves are inherently weak against stains due to the nature of storing numerous information in the form of a two-dimensional pattern within a relatively small area.

SUMMARY OF THE INVENTION

Accordingly, in view of above-described problems encountered in the related are, a principal object of the present invention is to provide a novel two-dimensional code capable of assuring excellent accuracy during the reading operation and providing an excellent data ratio (i.e. a ratio of a data area to the whole code area).

In order to accomplish this and other related objects, a first aspect of the present invention provides a two-dimensional code comprising: cells, each representing binary-coded data; the cells being placed on a two-dimensional matrix as a pattern, so as to be readable by a scanning operation along a predetermined scanning line; and at least two positioning symbols disposed at predetermined positions in the matrix, each of the positioning symbols having a pattern capable of gaining an identical frequency component ratio irrespective of orientation of the scanning line when the scanning line passes through the center of each positioning symbol.

In the above two-dimensional code, it is preferable that the predetermined positions are apexes of the two-dimensional matrix, or the positioning symbol has a pattern including concentric similar figures successively overlapped, or there are provided a series of timing cells including light and dark cells alternately arrayed with an inclination of 1/1 in the two-dimensional matrix. The binary-coded data may include a plurality of characters, and each of the characters is represented by a group of cells disposed in a two-dimensional region of the two-dimensional matrix.

Furthermore, an apex detecting cell is disposed on an apex of the matrix where the positioning symbol is not disposed.

A second aspect of the present invention provides a two-dimensional code reading apparatus for optically reading a two-dimensional code including binary-coded cells placed on a two-dimensional matrix as a pattern, the two-dimensional code including a symbol disposed in the vicinity of an apex of the two-dimensional matrix, the symbol having a pattern including concentric similar figures overlapped successively, the reading apparatus comprising: an image pickup device taking an image of the two-dimensional code, then converting the image into image signals pixel by pixel in response to light intensity of the image, and successively outputting resultant image signals; and a decoder unit decoding the resultant image signals into binary-coded signals; wherein the decoder unit comprises: binary-encoding means for binary encoding the image signals in accordance with a level of each signal, and outputting binary-coded signals successively; memory means for storing the binary-coded signals as image data in accordance with a position of a pixel where the image was taken; symbol detecting means for detecting a specific pattern corresponding to the symbol based on the binary-coded signals; apex detecting means for detecting coordinates of the symbol from the image data stored in the memory means based on the specific pattern detected by the symbol detecting means; matrix position determining means for finalizing a contour and an orientation of the two-dimensional matrix based on the coordinates of the symbol detected by said apex detecting means, thereby identifying all the coordinates of the binary-coded cells placed on the two-dimensional matrix; and reading means for reading out the image data stored in the memory means in accordance with the finalized contour and orientation of the two-dimensional matrix.

In the above two-dimensional code reading apparatus it is preferable that the two-dimensional code comprises a series of timing cells including light and dark cells alternately arrayed in the matrix, optically readable by the image pickup device; and the decoder unit further comprises timing cell detecting means for detecting coordinates of each timing cell from the image data stored in the memory means in accordance with the coordinates of the symbol obtained by the apex detecting means, the timing cells determining a cell position of the image data in accordance with their intervals.

The two-dimensional code is created by taking an exclusive-OR between a predetermined provisional two-dimensional code and a two-dimensional cell-feature-conversion code which includes a specific conversion pattern represented by light and dark cells corresponding to a data region of the provisional two-dimensional code; and the reading means restores information of the two-dimensional code by taking an exclusive-OR between the two-dimensional image data obtained from the image pickup means and two-dimensional image data of the two-dimensional cell-feature-conversion code stored in the memory means.

A third aspect of the present invention provides a two-dimensional code reading method for optically reading a two-dimensional code including binary-coded cells placed on a two-dimensional matrix as a pattern, comprising steps of: disposing a symbol in the vicinity of an apex of the matrix of the two-dimensional code, the symbol having a pattern including concentric similar figures overlapped successively; taking an image of the two-dimensional code by an image pickup device, then converting the image into image signals pixel by pixel in response to the light intensity of the image, and binary encoding the image signals in accordance with a level of each signal, then storing the binary-coded signals as image data in a memory means in accordance with a position of a pixel where the image was taken; detecting a specific pattern corresponding to the symbol based on the binary-coded signals, as parallel processing to the step of storing the binary-coded signals in the memory means; detecting coordinates of the symbol from the image data stored in the memory means based on the detection of the specific pattern; finalizing a contour and an orientation of the two-dimensional matrix based on the coordinates of the symbol, thereby identifying all the coordinates of the binary-coded cells placed on the two-dimensional matrix; and reading out the image data stored in the memory means in accordance with the finalized contour and orientation of the two-dimensional matrix.

A fourth aspect of the present invention provides a two-dimensional code comprising: cells each representing a binary-coded data; the cells being placed on a two-dimensional matrix as a pattern, so as to be readable by a scanning operation along a predetermined scanning line; and timing cells arrayed in the matrix in alternating light and dark manner with an inclination of 1/1.

A fifth aspect of the present invention provides a two-dimensional code comprising: cells, each representing binary-coded data; the cells being placed on a two-dimensional matrix as a pattern, so as to be readable by a scanning operation along a predetermined scanning line; wherein the two-dimensional code is created by taking an exclusive-OR between a predetermined provisional two-dimensional code and a two-dimensional cell-feature-conversion code which includes a specific conversion pattern corresponding to a data region of the two-dimensional code.

A sixth aspect of the present invention provides a two-dimensional code comprising: cells, each representing binary-coded data; the cells being placed on a two-dimensional matrix as a pattern, so as to be readable by a scanning operation along a predetermined scanning line; and a group of cells representing a character, disposed in a two-dimensional region of the matrix.

In the above fourth or sixth aspect of the present invention, it is preferable to further provide at least two positioning symbols disposed at predetermined positions in the matrix, each of the positioning symbols having a pattern capable of gaining an identical frequency component ratio irrespective of orientation of the scanning line when the scanning line passes through the center of each positioning symbol.

In the above fifth aspect of the present invention, it is preferable that the specific conversion pattern includes light and dark cells, and the exclusive-OR is taken cell by cell between the predetermined provisional two-dimensional code and the two-dimensional cell-feature-conversion code.

Moreover, a seventh aspect of the present invention provides a two-dimensional code comprising: cells, each representing binary-coded data; the cells being placed on a two-dimensional matrix as a pattern, so as to be readable by a scanning operation along a predetermined scanning line; at least two positioning symbols disposed at predetermined positions in the matrix, each of the positioning symbols having a pattern capable of gaining an identical frequency component ratio irrespective of orientation of the scanning line when the scanning line passes through the center of each positioning symbol; and data cells being processed by a predetermined conversion processing into a characteristic pattern different from the pattern of the positioning symbols.

According to the present invention, there are provided at least two positioning symbols disposed at predetermined positions in the matrix. Each of the positioning symbols has a pattern capable of gaining the same frequency component ratio irrespective of orientation of a scanning line when the scanning line passes through the center of each positioning symbol. Accordingly, this positioning symbol enables us to surely obtain the same characteristic frequency component ratio irrespective of the orientation of a scanning line. It is, hence, not necessary to repeat the scanning operation extensively changing its scanning angle. Thus, in the scanning operation of the code matrix, at least two predetermined positions are quickly and easily detected. Once the predetermined two positions are detected in the code matrix, the position and a rotational angle of the whole matrix are easily calculated based on the distance and angle between them.

The predetermined positions can be apexes (i.e. corners) of the matrix. When the predetermined positions are apexes of the matrix, they will be found immediately during the scanning search, and obtaining the contour of the two-dimensional code will be easy. Furthermore, it is advantageous that the apexes are seldom disturbed by other code patterns when they are searched.

The positioning symbols are disposed in at least two corners of the matrix, and each positioning symbol is a pattern including concentric successively overlapped similar figures.

In this invention, it should be understood that the pattern capable of gaining the same frequency component ratio is a light-and-dark pattern which is consistently similar regardless of the direction of the scanning angle when the scanning line passes through the center of the pattern. For example, such a pattern will include concentric successively overlapped similar figures. More specifically, one typical pattern consists of a large square of dark cells, a middle square of light cells concentric with but smaller in size than the large square, and a small square of dark cells concentric with but smaller in size than the middle square. The figures are not limited to squares only; for example, circles, hexagons and other various figures, especially regular polygons, circles and ellipses can preferably be used. However, in view of the fact that the most popular shape of the matrix is a square, the most preferable positioning symbol would be a square or a rectangle since its shape fits the matrix and loss of space can be suppressed to a minimum level. Particularly, a square is most preferable since it assures the least amount of loss.

According to the present invention, the two-dimensional code includes a series-of light and dark cells alternately arrayed in the matrix with an inclination of 1/1.

Arraying light and dark cells in an alternating manner is advantageous in that the position of each cell unit is easily detected compared with the arrangement of consecutively arrayed light (white) or dark (black) cells. However, if the arrangement of alternately arrayed light and dark cells (hereinafter referred to as alternating light and dark cells) is parallel to the side, according to the related art such alternating light-and-dark cells must stretch along at least two directions—i.e. in both a vertical direction and a horizontal direction, to cover the positions of all the cells involved in the matrix. However, for a square matrix being one example of the present invention, the line of such alternating light-and-dark cells is disposed with an inclination of 1/1 from an apex. In this case, the number of cells constituting the alternating light-and-dark cells is as small as the number of cells constituting one side of the square matrix. Thus, the remaining cells are effectively available for other useful information.

Of course, it is preferable that the line of the alternating light-and-dark cells is disposed diagonally from an apex in view of the ease in searching for the positions of alternating light-and-dark cells. However, the same can be disposed from an intermediate point of a side instead of the apex. In such a case, the matrix will include a plurality of 1/1 inclined lines of alternating light-and-dark cells.

For a matrix other than a square, a 1/1 inclined line of alternating light-and-dark cells starting from one apex cannot connect two diagonally disposed apexes. This means that such a 1/1 inclined line cannot cover all the cells. But, this problem is solved by providing another 1/1 inclined line of alternating light-and-dark cells starting from the other apex. In the event that the problem is not solved, it will be effective to provide still another 1/1 inclined line of alternating light-and-dark cells starting from an appropriate intermediate portion of a side. Even in such a case, it is possible to gain more available space for other information than the related art arrangement of arraying alternating light-and-dark cells along both the vertical and lateral sides.

A group of cells representing a character in the data region can be summarized in a two-dimensional pattern. This two-dimensional arrangement is useful in that the number of characters becoming unreadable due to the presence of a stain having a predetermined area is minimized. The two-dimensional arrangement is advantageous in reducing the affect of a stain. Therefore, the number of spoiled characters can be reduced. The two-dimensional arrangement will be, for example, embodied as a square or a rectangular pattern. In the case that the cell number of one character unit does not fit a square or a rectangle, it will be possible to combine two characters to form a square or a rectangle.

The two-dimensional code can be processed by a predetermined conversion processing into a desirable pattern, instead of directly placing it on the matrix. For example, in the two-dimensional code, a pattern of the data region can be differentiated from that of the non-data region. In this invention, the non-data region includes the above-described positioning symbols and the 1/1 inclined alternating light-and-dark cells whose characteristic patterns must be detected in the beginning of the scanning operation. Thus, it is important for conversion processing to eliminate like patterns existing in the data region.

For example, there is provided a conversion matrix of the same size as the data region in which a predetermined pattern for conversion is formed. Then, the data region is converted into a different pattern by taking an exclusive-OR with this pattern. One predetermined pattern will not always guarantee that the data region is reliably converted into a desirable pattern. It is thus recommended that a plurality of predetermined patterns be prepared beforehand, so that the same number of different patterns are produced by converting the data region by each of these patterns. Then, the preferable pattern is selected from among them by determining which one is most different from the non-data region.

Moreover, it is desirable in the present invention that there is provided an apex detecting cell which is disposed on an apex of the matrix where the positioning symbol is not disposed.

BRIEF DESCRIPTION OF THE DRAWINGS

The above and other objects, features and advantages of he present invention will become more apparent from the following detailed description which is to be read in conjunction with the accompanying drawings, in which.

DETAILED DESCRIPTION OF THE PREFERRED EMBODIMENTS

Preferred embodiments of the optically readable two-dimensional code, the related method and apparatus using the same in accordance with the present invention will be explained in greater detail hereinafter, with reference to the accompanying drawings. Identical parts are denoted by identical reference number throughout the views.

Figure 1:
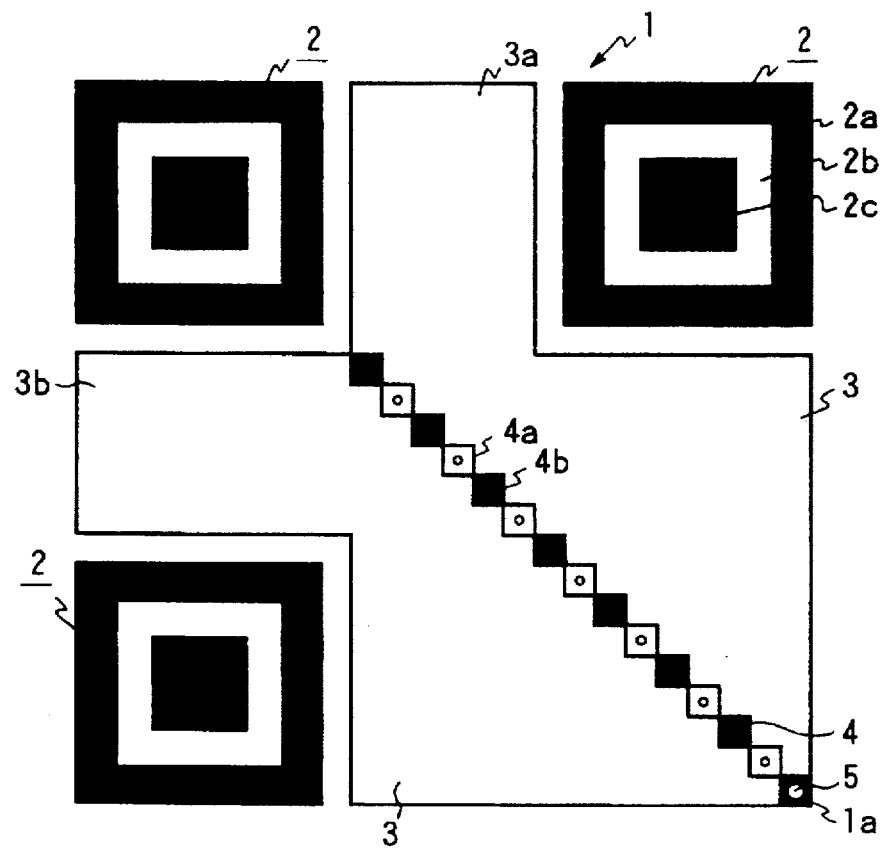
FIG. 1 is a view illustrating one example of a two-dimensional code in accordance with the present invention.

FIG. 1 shows one embodiment of a two-dimensional code 1 in accordance with the present invention. This two-dimensional code 1 is a square having four apexes at its corners and comprises three isolated positioning symbols 2,2,2 placed at three corners of the two-dimensional code 1, a data region 3, a series of timing cells 4 diagonally extending in the data region 3, and an apex detecting cell 5 located at the remaining corner of the two-dimensional code 1. This two-dimensional code 1, a square code, is constituted by the same number of vertical and lateral cells (21 cells×21 cells). Each cell is selected from optically discriminable two kinds of cells, white (light) and black (dark) cells as shown in the drawings and in the explanation of this embodiment. The timing cells 4 correspond to 1/1 inclined alternating light and-dark cells. The apex detecting cell 5 acts as one of the timing cells 4. FIG. 1 shows a blank condition where no data is described in the data region 3.

The positioning symbols 2,2,2 are disposed at three of the four corners of the two-dimensional code 1. The light and dark arrangement of cells in each positioning symbol 2 is characterized by a pattern consisting of a large square 2a of black cells, a middle square 2b of white cells concentric with but smaller in size than the large square 2a, and a small square 2c of black cells concentric with the middle square 2b, but smaller in size.

Figure 2A:
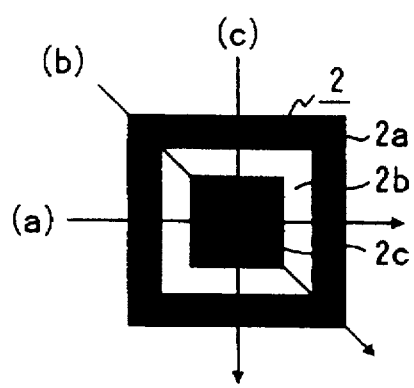
FIGS. 2A and 2B are views illustrating the frequency characteristics of the positioning symbols in accordance with the present invention.
Figure 2B:
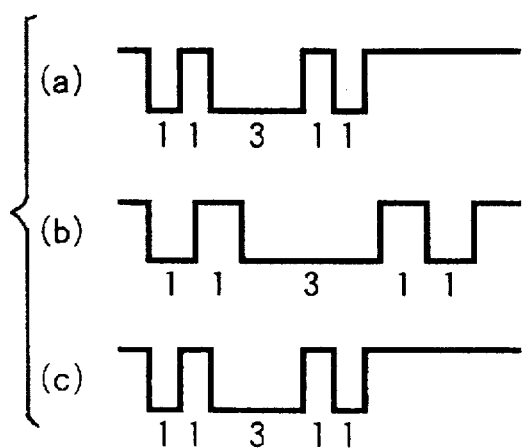

FIG. 2 shows the scanning operation of this positioning symbol 2 and resultant light and dark signals. FIG. 2A shows representative three straight scanning lines (a), (b) and (c), each passing through the center of the positioning symbol with a distinctive angle. FIG. 2B shows signal waveforms corresponding to the light and dark patterns detectable along each of the scanning lines (a), (b) and (c), each frequency component ratio of which is identical with the others. More specifically, the frequency component ratio obtainable from each of the scanning lines (a), (b) and (c) passing through the center of the positioning symbol 2 is as follows:

$$dark:light:dark:light:dark = 1:1:3:1:1$$

Needless to say, the same frequency component ratio is obtainable from any straight scanning line having an intermediate angle between the scanning lines (a), (b) and (c).

From this, it is known that the characteristic frequency component ratio of the positioning symbol 2 is easily detectable by executing only one scanning operation in a predetermined direction. In other words, it is not necessary to repeatedly execute the scanning operation by changing the angle of the straight scanning line until the predesignated pattern is detected. Accordingly, the central position of the positioning symbol 2 can be easily and quickly found. Thus, the position of the two-dimensional code 1 is promptly identified, and the processing which follows can be started immediately.

As the positioning symbol can be identified by only one scanning operation, it is no longer necessary to repeatedly change the angle of scan to determine whether the image taken from an image pickup device such as a TV camera includes various noises other than the two-dimensional code 1. Hence, the position of the two-dimensional code 1 is immediately recognized. In addition, all that is required after determining the position of the two-dimensional code is to search only the vicinity of the found positioning symbol 2. Therefore, the code in the data region is speedily read out. Moreover, the means for detecting the specific frequency component ratio is well suited for hardware processing, which is executable in parallel with image take-in processing by means of the TV camera etc. This means that the speed of reading out the code can be further increased.

Next, explained with reference to FIG. 3, is a simple method of obtaining the contour of the two-dimensional code, realized by providing more than two positioning symbols 2 at corners of the code.

Figure 3A:
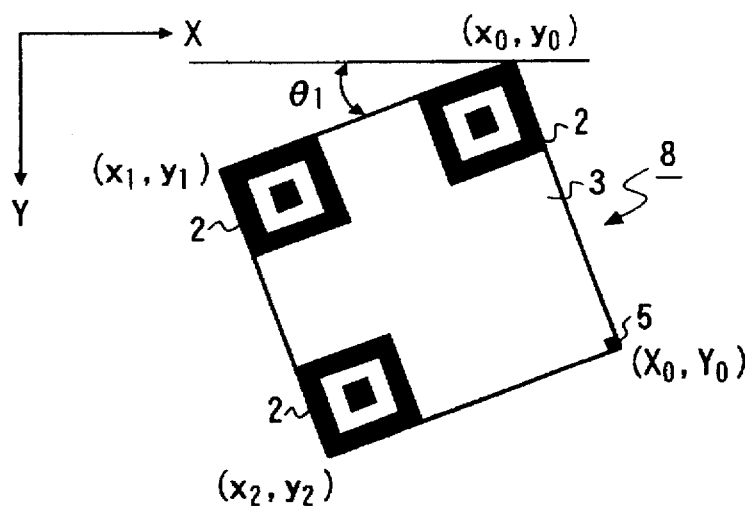
FIGS. 3A–3C are views illustrating placement and processing of the positioning symbols in accordance with the present invention.

FIG. 3A shows one example of a two-dimensional code 8 whose three corners are provided a positioning symbol 2, respectively. If the central position of each of three positioning symbols 2, 2, 2 is found, it is possible to calculate the coordinates of three apexes of the two-dimensional code 8 based on the coordinates of the centers of the positioning symbols. Assuming that $(x_0, y_0)$, $(x_1, y_1)$ and $(x_2, Y_2)$ represent the coordinates of the three apexes, the following equations 1 and 2 will obtain the coordinates $(X_0, Y_0)$ of the remaining apex. Thus, the contour of the two-dimensional code 8 is recognized. Furthermore, the following equation 3 will obtain an inclination $\theta_1$ of the two-dimensional code 8.

$$X_0 = x_0 + (x_2 - x_1) \quad (1)$$
$$Y_0 = y_0 + (y_2 - y_1) \quad (2)$$

$$\theta_1 = \tan^{-1} \frac{y_0 - y_1}{x_0 - x_1} \quad (3)$$

Needless to say, it is possible to directly obtain the coordinates $(X_0, Y_0)$ of the remaining apex based on the coordinates representing the centers of three positioning symbols 2, 2 and 2.

Furthermore, as shown in FIG. 3A, it is preferable to provide an apex detecting cell 5 on an apex where the positioning symbol 2 is not disposed. In this case, the search will be conducted in the vicinity of the apex $(X_0, Y_0)$ obtained from the equations 1 and 2, to find the apex detecting cell 5. By regarding the coordinates of the apex detecting cell 5 thus obtained as accurate apex coordinates $(X_0, Y_0)$, the contour of the two-dimensional code is precisely obtained even if the two-dimensional code is distorted. Needless to say, such an apex detecting cell 5 can be omitted if no distortion is expected.

Figure 3B:
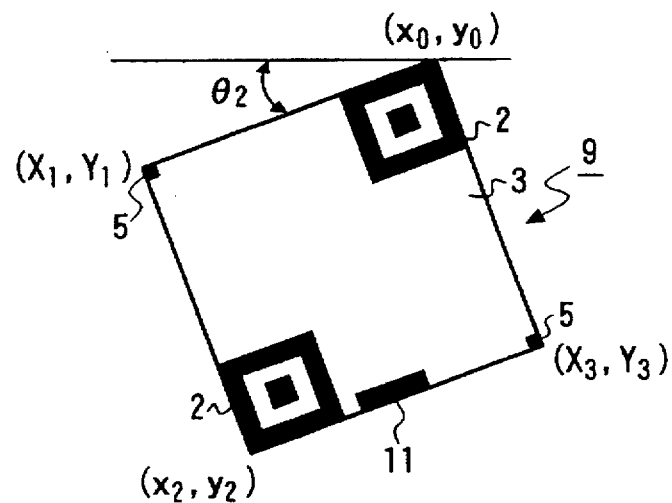

FIG. 3B shows an another two-dimensional code 9 in accordance with the present invention, which is characterized by two positioning symbols 2, 2 disposed at two diagonal corners of the two-dimensional code 9, whereas the two-dimensional code 8 of FIG. 3A includes three positioning symbols 2—2 disposed at three corners thereof. It will be preferable to additionally provide the apex detecting cell 5 in case of the presence of distortion. The contour and an inclination $\theta_2$ of the two-dimensional code 9 are obtained from the following equations 4–8. An advantage of this example is that the data ratio is increased. However, an orientation determining symbol 11 will be additionally required to determine the actual rotational position of the two-dimensional code 9.

$$X_1 = \frac{x_0 + x_2 - y_2 + y_0}{2} \quad (4)$$

$$Y_1 = \frac{y_0 + y_2 - x_0 + x_2}{2} \quad (5)$$

$$X_3 = \frac{x_0 + x_2 - y_0 + y_2}{2} \quad (6)$$

$$Y_3 = \frac{y_0 + y_2 - x_2 + x_0}{2} \quad (7)$$

$$\theta_2 = \tan^{-1} \frac{y_0 - x_2 - y_2 + x_0}{x_0 - y_0 - x_2 + y_2} \quad (8)$$

Figure 3C:
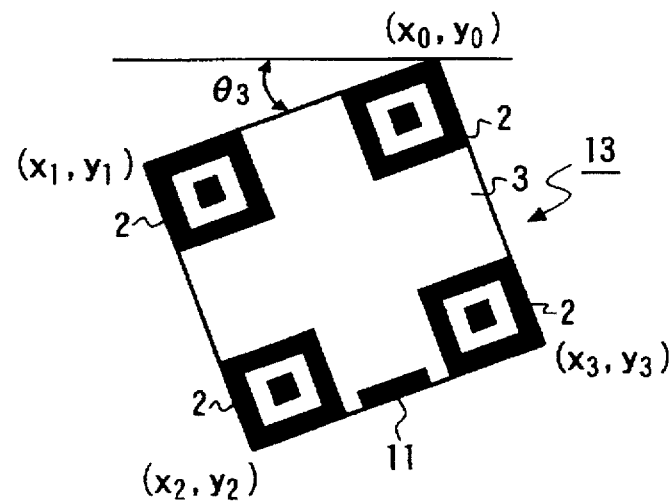

FIG. 3C shows a two-dimensional code 13 in accordance with the present invention, which includes positioning symbols 2 disposed at every corner of the two-dimensional code 13. This example is advantageous in that the contour of two-dimensional code 13 is directly obtained even if the two-dimensional code 13 includes a significant distortion. An inclination $\theta_3$ is obtained from the equation $\theta_3 = \tan^{-1}(y_1-0/x_1-x_0)$. However, the data ratio is decreased. When positioning symbols are disposed at all the corners, it is difficult to recognize the orientation of the code 13. For this reason, it is necessary to provide the orientation determining symbol 11 for identifying the orientation of the code 13.

The timing cells 4, being alternating light and dark cells as shown in FIG. 1 include white cells 4a and black cells 4b alternately disposed so as to diagonally extend from one apex 1a of the two-dimensional code 1. That is, the timing cells 4 are arrayed with a 1/1 inclination (i.e. 45° inclination) in the data region 3 of the two-dimensional code 1. These timing cells 4—4 are used for accurately detecting the coordinates of each data cell. In other words, the cell position of image data is determined in accordance the with intervals of these timing cells 4—4.

Figure 4A:
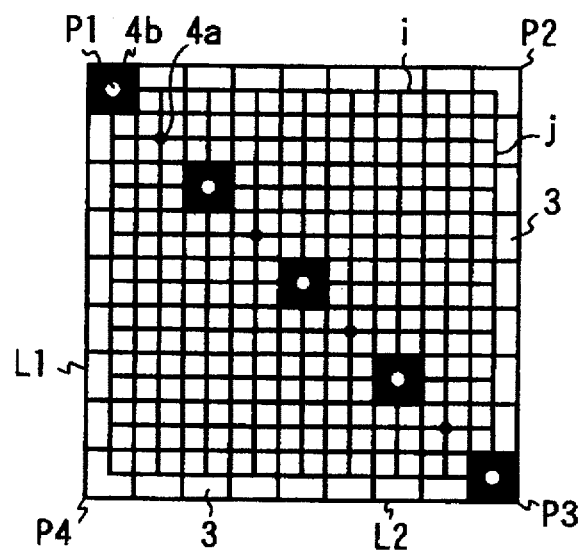
FIGS. 4A and 4B are views illustrating placement of timing cells in accordance with the present invention.
Figure 4B:
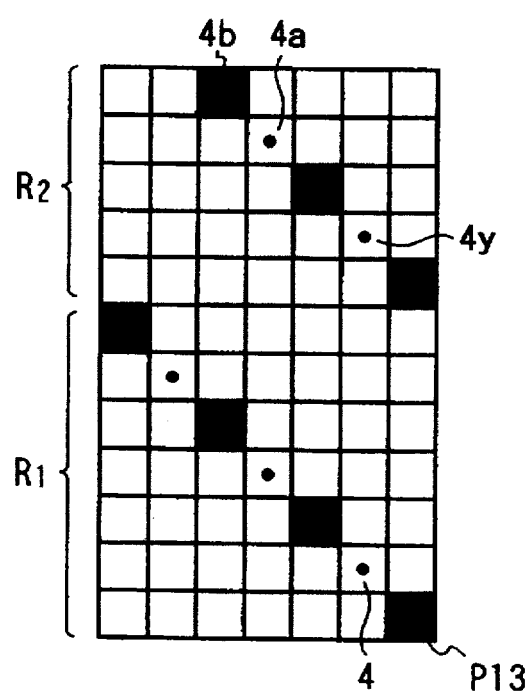

FIGS. 4A and 4B show representative arrangements of the timing cells 4. The timing cells 4 disclosed in FIG. 4A are arrayed diagonally from one apex P1 to the other apex P3 in such a manner that light and dark cells 4a and 4b are placed in an alternating manner so as to extend from the top left to the bottom right.

The coordinates of each data cell in the data region 3 can be obtained using these timing cells 4 First of all, the coordinates of the center of each timing cell 4 is obtained. Then, virtual lines i and j are drawn from the centers of timing cells 4 in vertical and horizontal directions, each line being parallel to either side L1 or L2 of the two-dimensional code. The virtual lines i—i extend horizontally so as to pass through the coordinates of the centers of the timing cells 4—4, while the other virtual lines j—j extend vertically so as to pass through the coordinates of the centers of the timing cells 4—4. Intersecting points formed by these virtual lines i—i and j—j are regarded as coordinates of each of the data cells 4—4. When compared with another method of obtaining the coordinates of the data cells that divides the entire two-dimensional code by the cell number of vertical and horizontal cells, the above-described method of obtaining the coordinates of each data cell using the timing cells 4 is advantageous in that error and the affect of code distortion can be eliminated. Thus, the accuracy of the reading operation can be increased.

Figure 18:
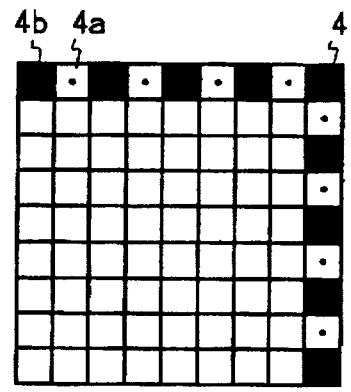
FIG. 18 is a view showing a typical placement of conventional timing cells.

FIG. 18 shows a conventional arrangement of the timing cells 4—4 which are disposed along two adjacent sides of the two-dimensional code. According to this conventional arrangement, the number of timing cells 4 required for a 9×9 matrix is 17. On the contrary, the 9×9 matrix disclosed in FIG. 4A requires only 9 cells. In other words, the number of cells other than data cells can be reduced; therefore, the data ratio of the two-dimensional code can be increased.

When the code shape is not a square, the timing cells 4 can be diagonally arrayed from an intermediate portion of a side of the code. For example, as shown in FIG. 4B, a series of timing cells 4 arrayed with an 1/1 inclination from an apex P13 can form intersecting points of virtual lines in the region R1, although the remaining region R2 has no intersecting points of virtual lines since it has only one kind of virtual line (i.e. vertical lines only). It is of course possible to determine the coordinates of data cells in the region R2 based only on the one kind of virtual line only. However, it is useful to provide another series of timing cells 4y in the region R2 for additionally forming horizontal virtual lines, so that the coordinates of all the cells in the data region can be accurately identified.

In the case of the two-dimensional code disclosed in FIG. 1, the data region 3 includes two protruding regions 3a and 3b where only one kind of virtual line (i.e. either vertical lines or horizontal lines) are drawn. However, the area of such a protruding region is so small that accuracy is sufficiently assured without causing substantial problems. Furthermore, the protruding regions 3a and 3b are sandwiched between positioning symbols 2 and 2; therefore, it is technically possible to obtain intersecting points in such regions by drawing the other kind of virtual line from each positioning symbol 2 based on the light and dark pattern thereof. Thus, the coordinates are further accurately obtained.

The data described in the data region 3 is generally encoded together with an error-correcting code restorable when it is contaminated by a stain or the like, and a CRC code for detecting an error. In particular, burst error-correcting codes are suitable for stained or damaged codes. Among them, a Reed Solomon code is well known since it has an excellent error correcting efficiency.

Figure 5:
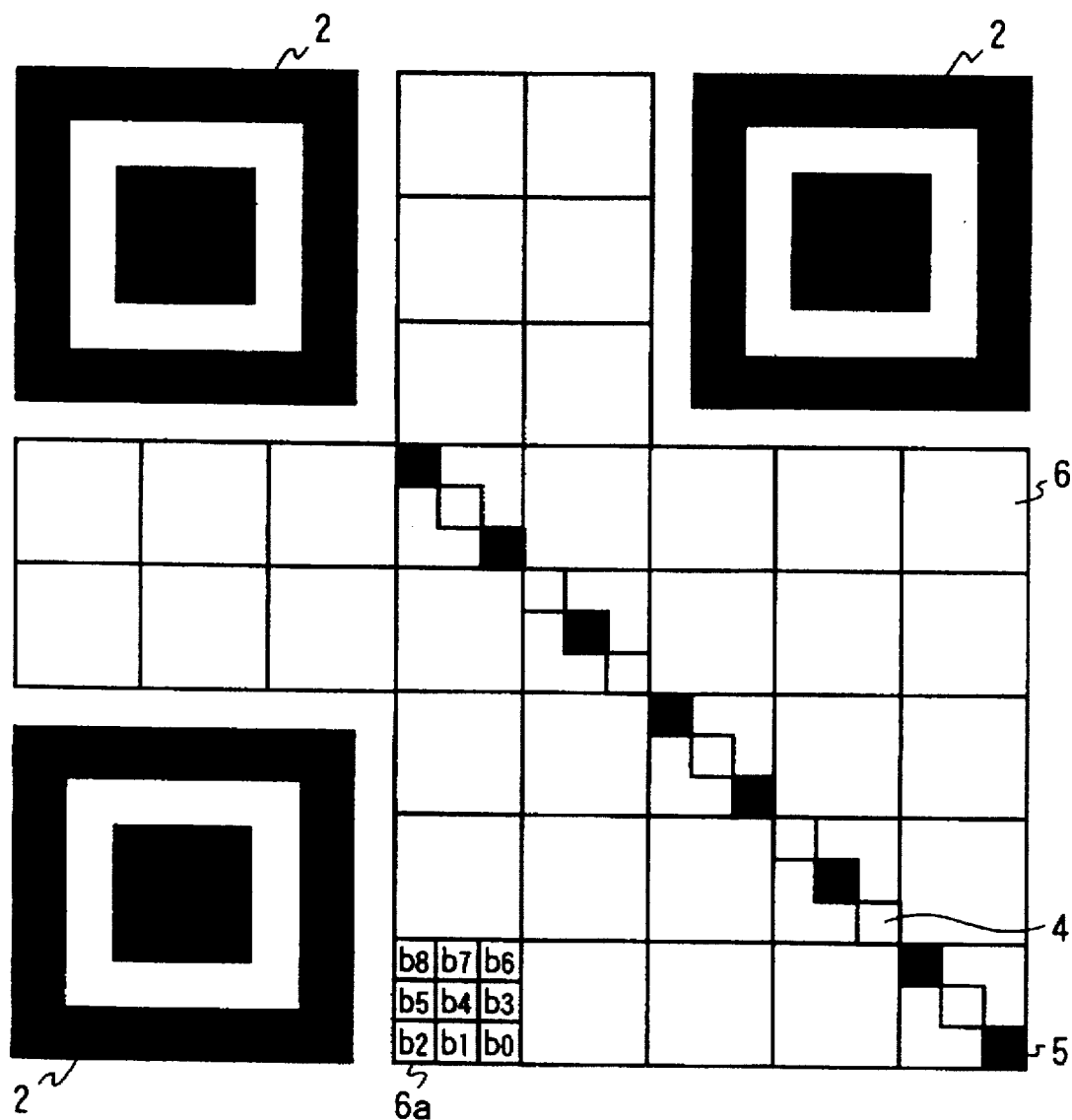
FIG. 5 is a view showing allocation of characters in accordance with the present invention.

In this embodiment, each character encoded by this kind of burst error-correcting code (which is expressed by a plurality of bits) is placed in the data cell region. FIG. 5 shows one example of such placement of a character. It is preferable that the cells 6a, each corresponding to a bit constituting part of a character, are summarized in a shape similar to a square without being dispersed. The example of FIG. 5 shows a group of nine cells (b0–b8) including eight bits dedicated to the data portion of a character and one bit dedicated to the parity portion. By arranging each cell group 6 of a character in a shape similar to a square in this manner, each character unit becomes resistant against stain and damage and is easily entered in an error-correcting region. Thus, its readability is improved.

Figure 6A:
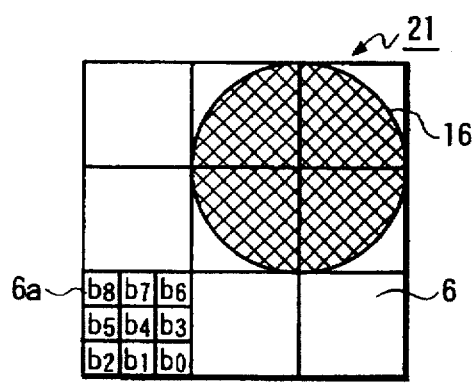
FIGS. 6A–6C are views comparatively illustrating the affect of a stain in the present invention and the related art.
Figure 6B:
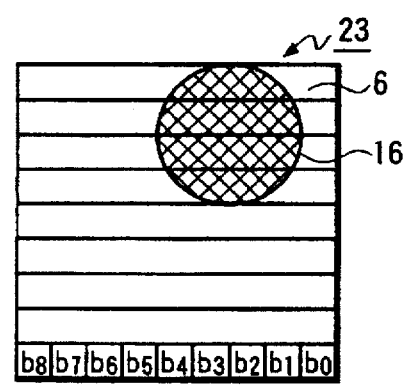

FIGS. 6A and 6B illustrate the difference between a square (i.e. a two-dimensional) cell group and a linearly arrayed (i.e. a one-dimensional) cell group representing a character, respectively, in order to explain that a two-dimensional code 21 including 3×3 square cell groups 6—6 is superior to a two-dimensional code 23 including 9 linearly arrayed cell groups 6—6 in view of readability during the presence of a stain. More specifically, FIG. 6A shows a circular stain 16 adhering to the two-dimensional code 21 which consists of 3×3 square cell groups 6—6, each representing a character. In this case, the stain 16 is illustrated in a maximum size capable of suppressing four spoiled characters. FIG. 6B shows another circular stain 16 adhering to the two-dimensional code 23 which consists of 9 linearly arrayed cell groups 6—6 piled up successively, each representing a character. Similarly, the stain 16 is illustrated in a maximum size capable of suppressing four spoiled characters.

Figure 6C:
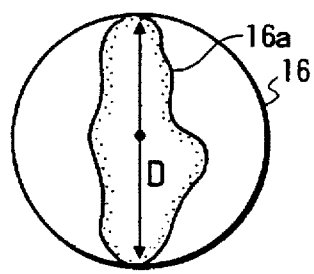

As it is difficult to predict the shape or angle of a stain or damage, it is assumed that a portion of the stain 16a shown in FIG. 6C affects the character cell groups 6—6 as would a circular stain 16 having a diameter D. Accordingly, when the overall shape of the character cell groups 6—6 is arranged into a square (3 cells×3 cells), the maximum diameter of the stain 16 spoiling only four character cell groups 6—6 is identical with the length of six consecutive cells as shown in FIG. 6A. On the other hand, when each character cell group 6 is arranged in a linear shape (1 cell×9 cells), the maximum diameter of the stain 16 spoiling only four character cell groups 6—6 is identical with the length of four consecutive cells as shown in FIG. 6B. As understood from above, arranging each character cell group 6 into a shape similar to a square is advantageous in keeping the number of spoiled characters as small as possible when the adverse effect of a stain or damage is inevitable. Thus, the characters are entered in an error-correcting region and are easily read.

As described above, the data of each character are allocated in the cells within the data region 3. According to a predetermined character format, either white or black is assigned to each cell 6a in each character cell group 6, thereby completing the pattern of the two-dimensional code 1.

Figure 7A:
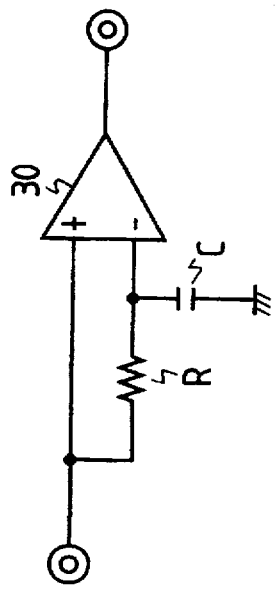
FIGS. 7A–7C are views showing characteristics of a conventional binary-encoding circuit.
Figure 7B:
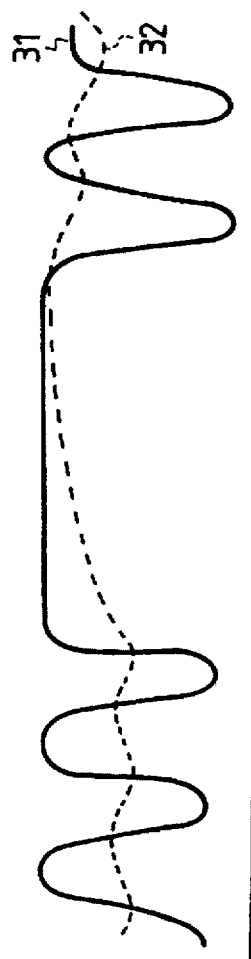

For some data, the following arrangement will be preferable. More specifically, if the encoded data is placed directly in the designated cell region without any modification, it is feared that there may be consecutive and extensive white cells or black cells which could possibly worsen the balance of the code. In such a case, accuracy will be decreased during the binary encoding operation, which will require complicated processing and a significantly longer time period. FIG. 7A shows a general binary encoding circuit using a comparator 30, which is fast and can respond to a change in brightness of the background. According to this kind of binary encoding circuit, a follow-up waveform 32 approaches either a white or a black level of the input waveform 31 as shown in FIG. 7B when white cells or black cells are so consecutively and extensively arrayed. Hence, it cannot assure the fidelity of the binary encoding operation for the next changing cell. Accordingly, a resultant binary-encoded signal 33 has a width wider or narrower than the actual cell width. Furthermore, there is a possibility that a certain pattern existing in the data region 3 may have exactly the same frequency component ratio as that of the positioning symbol 2. If such a situation really happens, it is readily presumed that such a data region 3 cannot be discriminated from the positioning symbol 2. In such an occasion, it is definitely necessary to conduct a search in the region including a confusing data region 3 for detecting the real positioning symbol 2 disposed at the corner of the two-dimensional code. In other words, additional processing will be required for obtaining a contour of the two-dimensional code. The time required for this kind of additional processing will be prolonged with each additional confusing data region 3 which has a frequency component ratio identical to the positioning symbol 2.

There are two preferable methods to solve this problem. One method is to provide dummy cells in the data region 3 and the character cell group 6 so as to be flexibly assigned to white or black depending upon the conditions. The other method is to totally change the features of the cells according to a predetermined rule after white and black cells are placed in the data region 3. Either way will be practically adaptable, although the former method is disadvantageous in that the data ratio is lowered for the provision of dummy cells.

In the case of the latter method, it is generally believed that an appropriate rule changing the feature of the cells is difficult to determine or discover. For this reason, it is desirable to prepare predetermined rules beforehand and determine the kind of change brought to the cell features in the data region by each of these rules. Once the resultant cell features are all checked, then it will be easy to select the best rule from among them. This method will be explained in more detail with reference to FIG. 8.

Figure 8:
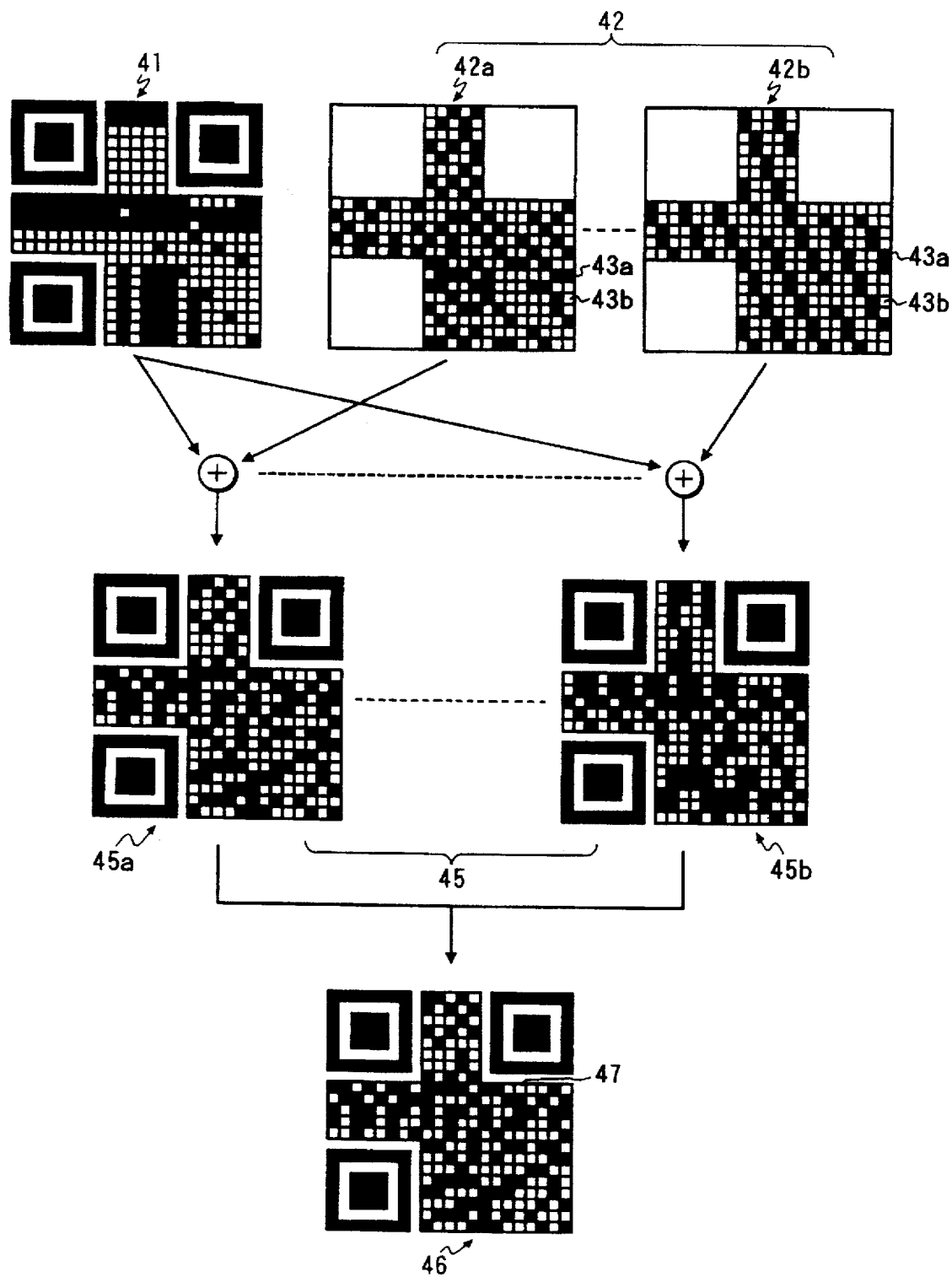
FIG. 8 is a view illustrating pattern conversion processing for differentiating the data region from the non data region in accordance with the present invention.

FIG. 8 shows, at upper left, a provisional two-dimensional code 41 including temporarily disposed data, and also shows, at upper center and right, two cell-feature-conversion matrix patterns 42a and 42b which are formed based on a random number and a certain regularity for changing cell features. The provisional two-dimensional code 41 is combined with each of the cell-feature-conversion matrix patterns 42a and 42b. More specifically, each cell on the provisional two-dimensional code 41 is reversed when its corresponding cell is a black cell 43a on the combined cell-feature-conversion matrix pattern 42a or 42b, while the features of the cell is not changed when its corresponding cell is a white cell 43b on the combined cell-feature-conversion matrix pattern 42a or 42b. In short, the resultant pattern obtained from the above combination is identical with an exclusive-OR of provisional two-dimensional code 41 and the cell-feature-conversion matrix pattern 42a or 42b. The above-described processing is executed with respect to each of all the matrix patterns 42 prepared. Thus, a plurality of converted patterns 45 is obtained equal to the number of cell-feature conversion matrix patterns prepared. Then, a determination is made as to whether white or black cells are arrayed consecutively and extensively and as to whether there happen to be a group of data cells having the same or similar frequency component ratio as that of the positioning symbol 2. As a result of the determination, the most preferable data (i.e. an optimum placement pattern) is determined, thereby obtaining a finalized two-dimensional code 46. In the embodiment disclosed in FIG. 8, it will be understood that the left-hand pattern 45a is selected as an optimum placement pattern among plural patterns 45. By the way, this processing is only applied to the data region 3.

The decoding operation of two-dimensional code 46 will be immediately carried out if the number of the cell-feature-conversion matrix patterns 42 is only one. However, when a plurality of matrix patterns 42 are used as described above, it is definitely necessary to determine the cell-feature-conversion matrix pattern 42 used for creating the finalized two-dimensional code 46. Thus, it is useful that the two-dimensional code 46 stores information data 47 indicating the type of the conversion matrix pattern 42 used in conversion processing for obtaining the two-dimensional code 46. If such an information data 47 is included, the data cells can be easily converted or reconstructed into their original pattern by taking an exclusive-OR between the corresponding cell-feature-conversion matrix pattern 42 and the two-dimensional code 46.

Figure 7C:
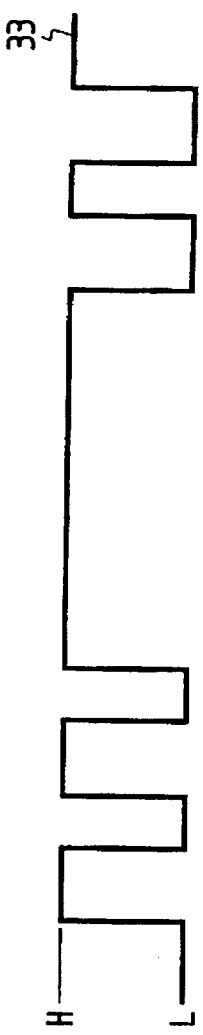
Figure 9A:
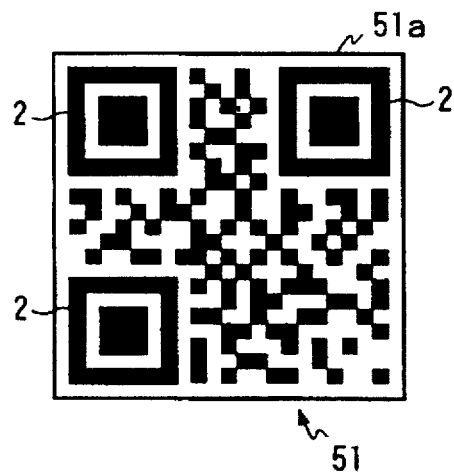
FIGS. 9A and 9B are views showing dummy lines provided around the two-dimensional code in accordance with the present invention.
Figure 9B:
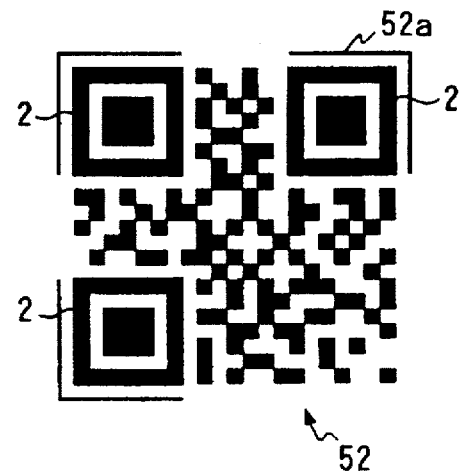

Next, a means for further improving the performance of the above-described two-dimensional code is explained and its ease of use is described. As shown in FIGS. 9A and 9B, it is preferable to provide dummy lines along the outer periphery of two-dimensional code 1. FIG. 9A shows an example of a dummy black line 51a surrounding the entire outer periphery of the two-dimensional code 51, so that the binary-encoding operation for the positioning symbols 2—2 and outer peripheral data cells of the two-dimensional code 51 can be accurately carried out. In general, the outer periphery of the two-dimensional code is a margin; therefore, it is feared that the outermost black cells in the positioning symbol 2 and the black data cells on the outer periphery cannot be accurately binary encoded as previously explained with reference to FIG. 7. Thus, surrounding the outer periphery of the two-dimensional code 51 with the dummy black line 51 a is useful to increase the accuracy in the binary-encoding operation of the black cells in the positioning symbols 2 and in the outer peripheral region.

The positioning symbols 2 are specially important for identifying the position of the matrix; therefore, it is preferable to provide dummy black lines 52a dedicated only to each positioning symbol 2 as shown in FIG. 9B, so that at least the frequency component of each positioning symbol is accurately detected and binary encoded precisely.

Figure 19:
FIG. 19 is a view illustrating an invalidation processing of a conventional bar code.

In some occasions, it may be required to invalidate the two-dimensional code. For a conventional bar code, the reading operation is easily disabled by simply drawing a line 131 across a bar code 130 as shown in FIG. 19. However, for the two-dimensional code, the length of a required nullifying line will be fairly long due to its two-dimensional arrangement. If the error-correcting code is involved as described above, drawing such a line is no longer effective to completely disable the two-dimensional code.

Figure 10:
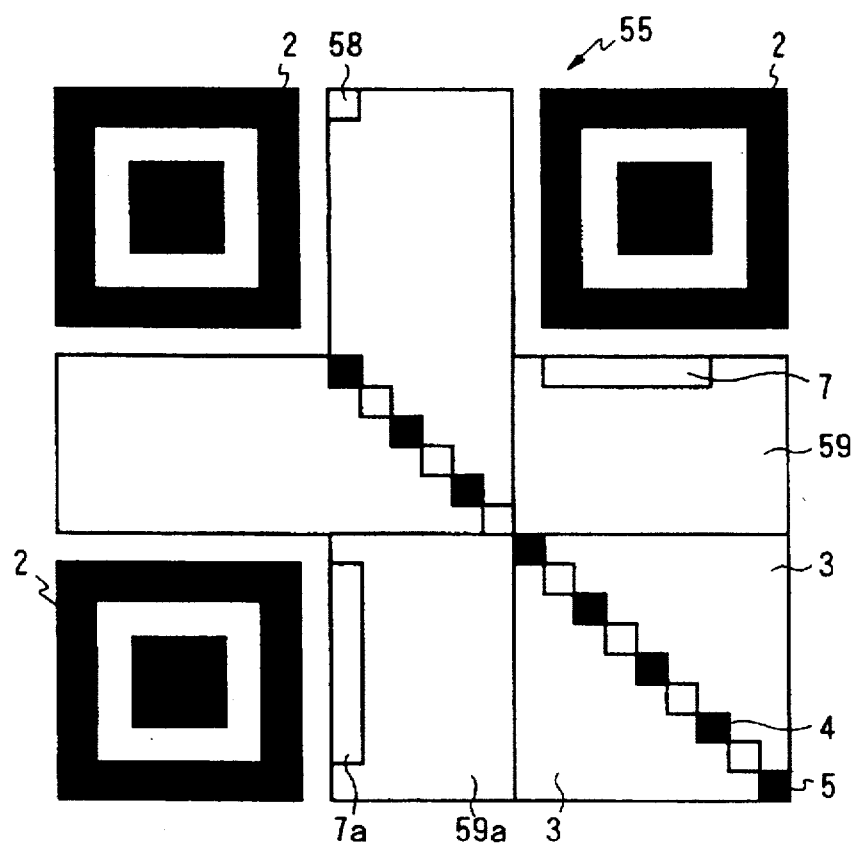
FIG. 10 is a view showing another example of the two dimensional code in accordance with the present invention.

To solve this problem, as shown in FIG. 10, it is desirable to provide a code-reading-prohibition cell 58 in the two-dimensional code 55. When the cell 58 is black, a reading device is prohibited from executing a reading operation. That is, the code-reading-prohibition cell 58 is checked prior to the decoding operation, and the decoding operation is prohibited when the cell 58 is black.

Furthermore, the two-dimensional code 55 may include important information 59 or a cell-feature-conversion matrix pattern information 7. In view of the adverse effect of a stain, damage or brightness change of the background, it is preferable to dispose the same information 59a and 7a at different positions spaced from information 59 and 7. Thus, even if one of the two identical pieces of information is spoiled, this arrangement allows the reading device to read at least the other piece information (i.e. the unspoiled one), thereby assuring the reading operation of important information 59 or 59a and the cell-feature-conversion matrix pattern information 7 or 7a.

Figure 11A:
FIGS. 11A–11C are views showing various modifications of the positioning symbols in accordance with the present invention.
Figure 11B:
Figure 11C:
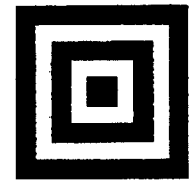

The above-described embodiment discloses the positioning symbols 2 of concentric squares having a predetermined frequency component ratio black: white:black:white:black= 1:1:3:1:1, along a straight scanning line passing through the center thereof. However, needless to say, the positioning symbol 2 can be constituted by concentric circles as shown in FIG. 11A, or concentric hexagons as shown in FIG. 11B, or any other concentric polygon. In short, any concentric successively overlapped similar figures can be used as positioning symbol 2. Furthermore, as long as the frequency component ratio along a straight scanning line passing through the center of the positioning symbol 2 is constant irrespective of the scanning angle, the similar figures can be overlapped more as shown in FIG. 11C.

Figures 12A, 12B, 13:
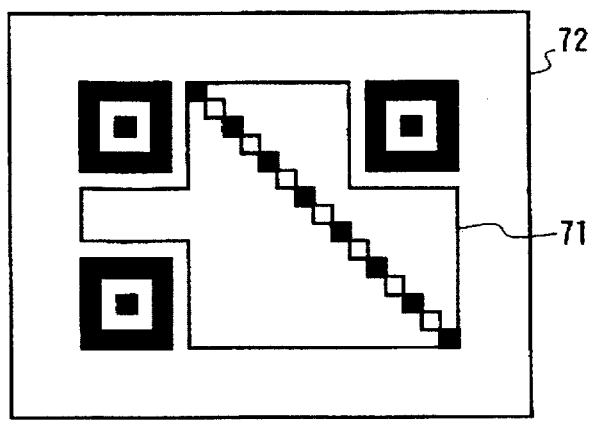
FIGS. 12A and 12B are views illustrating various modifications of placement of the character cell groups combined with each other in accordance with the present invention.
FIG. 13 is a view showing another embodiment of the two-dimensional code in accordance with the present invention, which is characterized by a rectangular shape.

Although the above-described embodiment shows the arrangement in which one character cell group 6 is arranged in a square, it is also possible to combine two character cell groups 66 and 67 as shown in FIG. 12A so as to form a square cooperatively. If it is difficult to obtain a complete square, it is further possible to constitute a rectangle as shown in FIG. 12B, so that combined character cell groups 69 and 70 cooperatively form a shape closer to a square.

Yet further, although the above-described embodiment discloses the two-dimensional code 1 having a regular square contour, the square contour can be replaced by a rectangular contour. Especially, when the two-dimensional code is read by a handy scanner, and when the scanner can be rotatable in accordance with the rotational position of the two-dimensional code, a horizontally elongated shape will be generally preferable as shown by a two-dimensional code 71 in FIG. 13, since such a shape meets the horizontal and vertical resolutions. By forming the two-dimensional code 71 in such a shape, data cells can be most effectively arranged within the reading area 72. Thus, it becomes possible to increase the amount of storable data.

Figure 14:
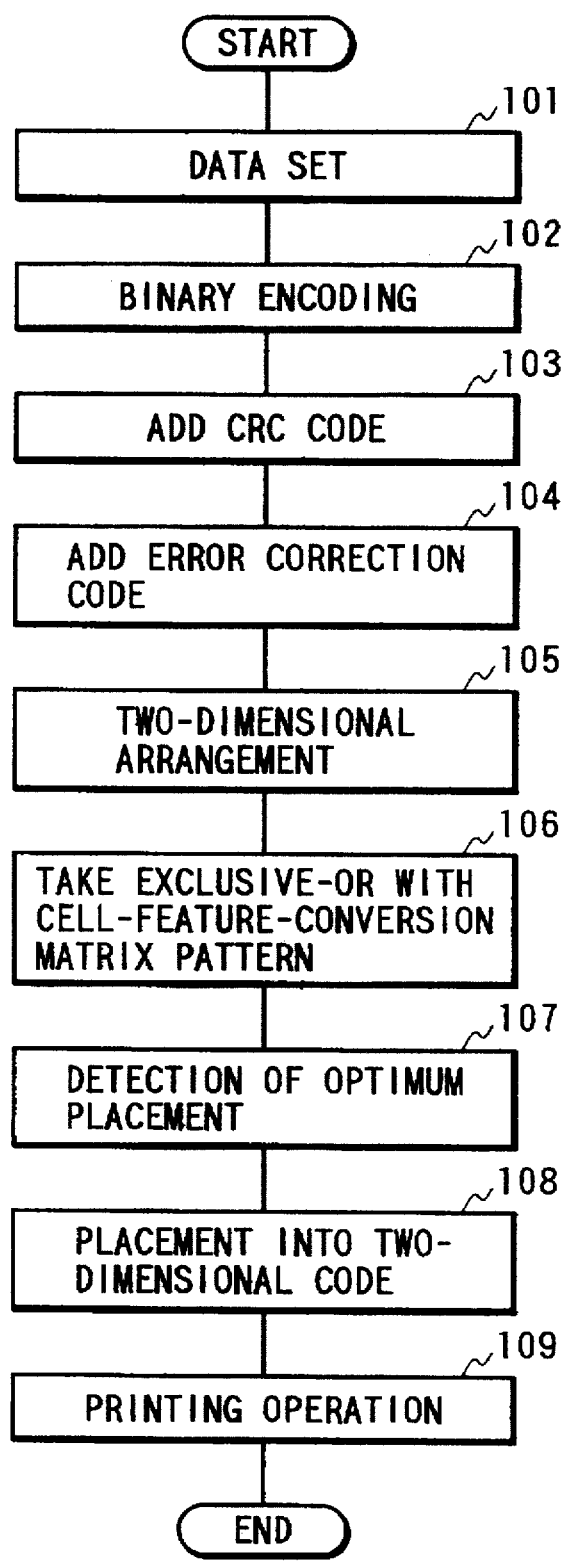
FIG. 14 is a flow chart showing a series of processes ranging from the encoding operation of the two-dimensional code to the printing operation in accordance with the present invention.

Next, a series of processes ranging from an encoding operation of two-dimensional codes to a printing operation will be explained with reference to FIG. 14. This processing is executed by a data processing apparatus of a two-dimensional code printing machine not shown.

First of all, data are set in a work memory (Step 101). Then, objective data are binary encoded into "0" or "1" to form a two-dimensional code (Step 102). Subsequently, an error detecting code (CRC) and an error-correcting code are attached to the data (Steps 103 and 104). Thereafter, these data are arranged in a two-dimensional pattern according to a predetermined rule (Step 105). Next, an exclusive-OR is taken by the resultant data pattern and each of cell-feature conversion matrix patterns prepared beforehand (Step 106). Then, an optimum placement pattern is selected among resultant patterns (Step 107). After that, the optimum placement pattern is placed in the two-dimensional code (Step 108). Then, the priming operation is executed (Step 109).

Figure 15:
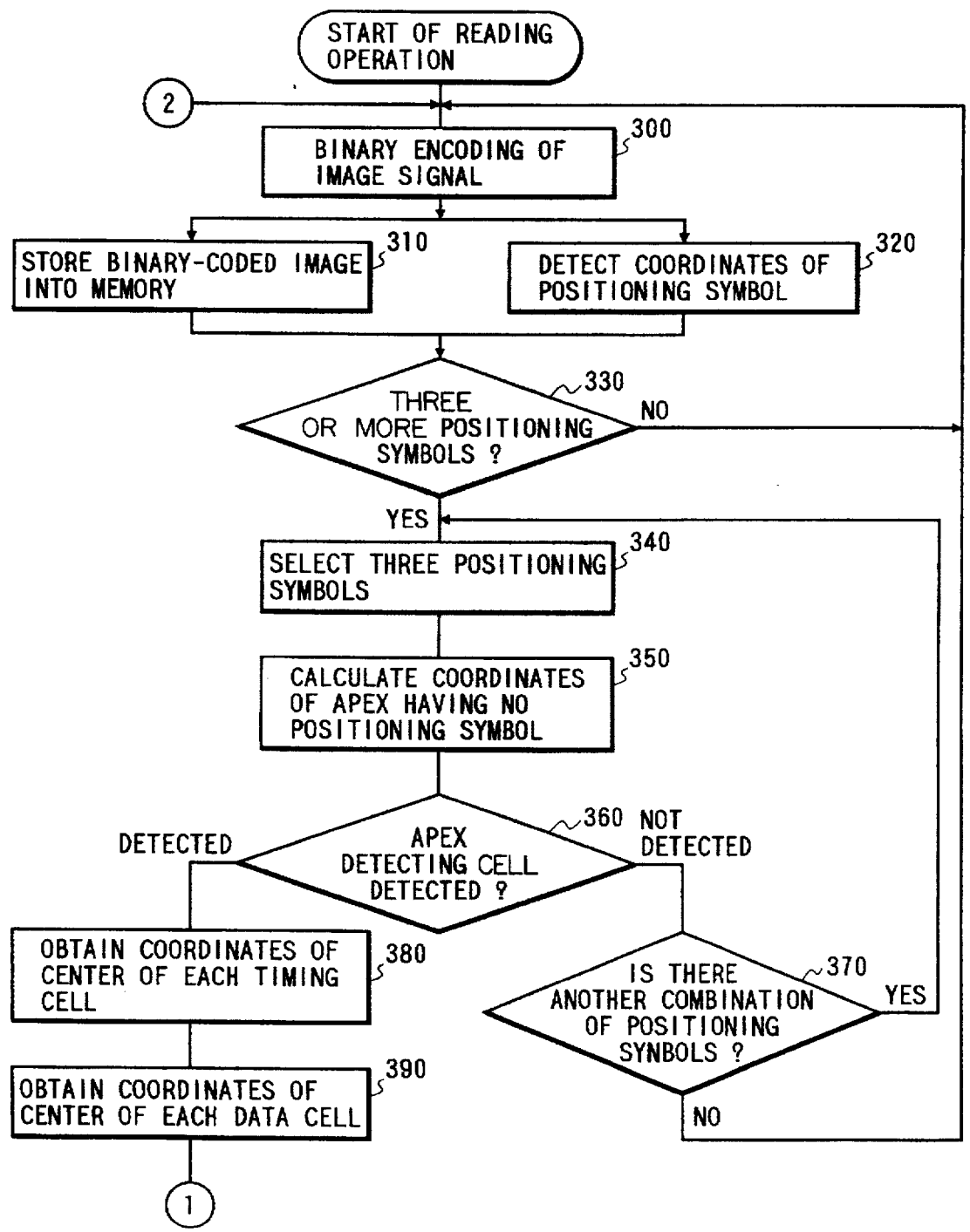
FIG. 15 is a flow chart showing a reading operation of the two-dimensional code in accordance with the present invention.
Figure 16:
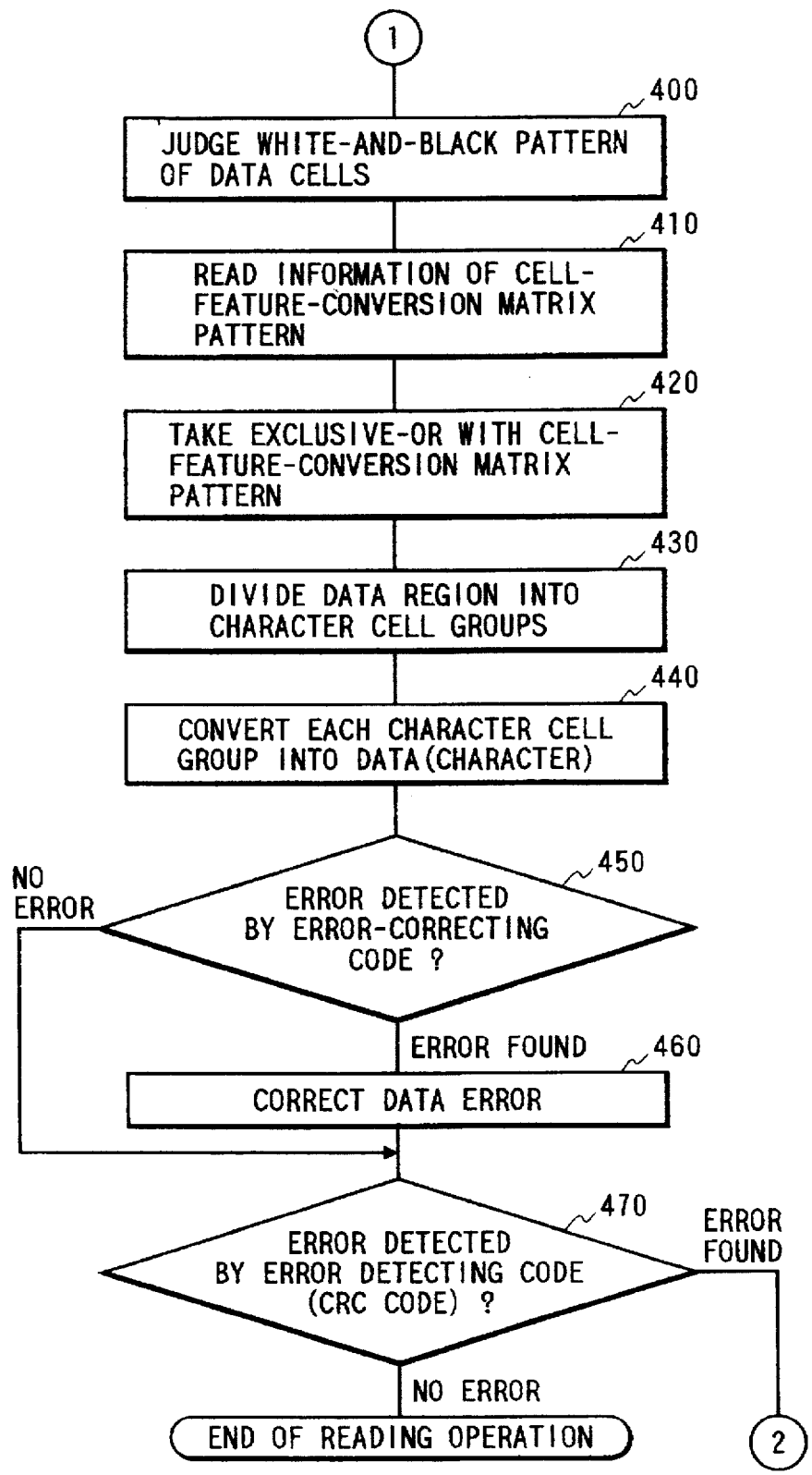
FIG. 16 is a flow chart showing the remainder of the reading operation of the above two-dimensional code in accordance with the present invention.
Figure 17:
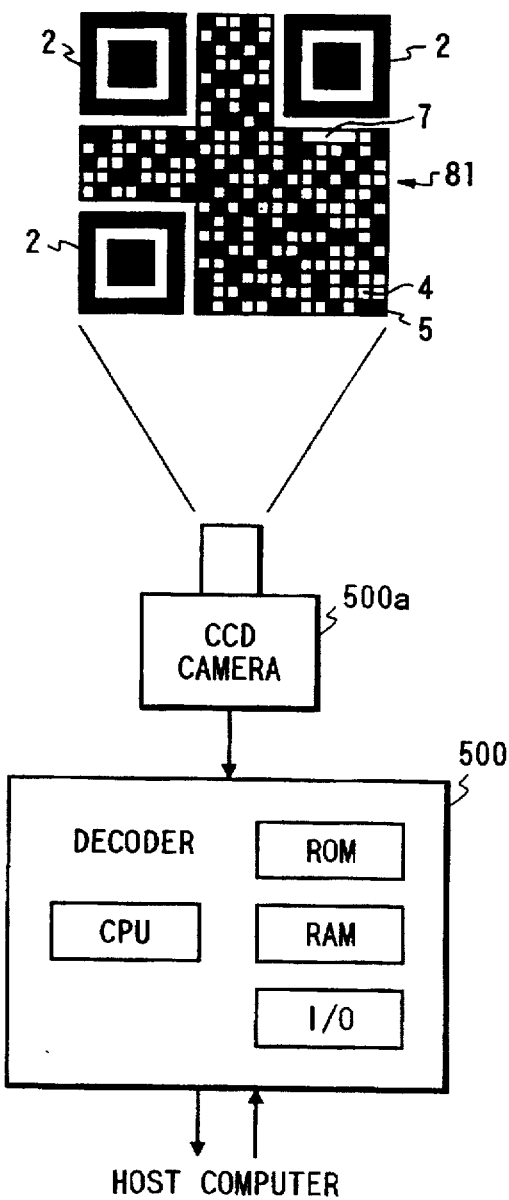
FIG. 17 is a view showing an arrangement of a reading device in accordance with the present invention.

Next, reading processing will be explained with reference to the flow charts of FIGS. 15 and 16. For this processing, a CCD camera 500a takes an image of cells in a two-dimensional code 81, then converts the image into analog or digital signals pixel by pixel in response to light intensity of the image, and successively outputting resultant image signals. The pixels correspond to each cell of the two-dimensional code 81. A decoder 500, comprising a CPU, a ROM, a RAM and an I/O unit, decodes the image signals of the two dimensional code 81 into binary-coded signals, as shown in FIG. 17.

After the reading operation is started, the image signals produced from the CCD camera 500a are binary encoded (Step 300) in accordance with a level of each signal, thereby successively producing binary-coded signals. The binary-coded image signals are successively stored into a memory (RAM) as an image data in every pixel through hardware processing (Step 310). Meanwhile, as parallel hardware processing, the coordinates of the positioning symbols 2 are detected based on the binary-coded image signals (Step 320). Namely, the specific pattern (i.e. the frequency component ratio of FIG. 2B) corresponding to the positioning symbol 2 is searched based on the binary-coded signals.

Subsequently, a judgement is made as to whether three or more positioning symbols 2—2 are found or not (Step 330). Namely, the coordinates of each symbol 2 is obtained from the image data stored in the memory means (RAM) based on the detection of the specific pattern (FIG. 2B). The procedure illustrated by this flow chart does not proceed to the next step unless it completely detects all of the three positioning symbols 2—2 of the two-dimensional code 81. Accordingly, when three positioning symbols are not found, the procedure returns to the step 300 to repeat the reading operation of the image again. It may happen that a total of four positioning symbols 2—2 are detected at a time. This may happen if a confusing pattern having exactly the same frequency component ratio as that of the positioning symbol 2 exists in the data region of the two-dimensional code 81 or in a region outside the two-dimensional code 81.

Thus, three of the found positioning symbols 2—2, although they are mere candidates of positioning symbols 2—2 at this moment, are selected (Step 340). Then, the coordinates of an apex having no positioning symbol 2 is calculated (Step 350). Thereafter, a judgement is made as to whether the apex detecting cell 5 is found at the position obtained in the step 350 (Step 360). If the apex detecting cell 5 is not detected, selection and combination are considered to be improper. Thus, the next judgement is made as to whether there is another possible combination of the positioning symbols 2—2 (Step 370). If the answer is YES, the procedure returns to the step 340 to change the combination of the positioning symbols 2—2. If the apex detecting cell 5 is not found (i.e. "NO" in the step 370) as a result of repetitive detections based on any possible selection and combination, then the procedure returns to the step 300 to restart binary-encoding processing of the image signals.

On the contrary, when the apex detecting cell 5 is found in the step 360, the coordinates of a center of each timing cell 4 are obtained by detecting the alternately extending light and dark timing cells 4—4 one after another along a diagonal from the apex detecting cell 5 (Step 380). Then, virtual lines are drawn from the centers of these timing cells 4—4, thereby obtaining the coordinates of a center of each data cell (Step 390).

In short, above-described sequential steps 340-390 finalize the contour and orientation of the two-dimensional matrix based on the coordinates of the positioning symbols 2—as previously explained with reference to FIGS. 3A-3C and equations (1)-(8), thereby identifying all the coordinates of the binary-coded cells placed on the two-dimensional matrix. In turn, on the basis of the finalized contour and orientation of the two-dimensional matrix, the following processes are executed for reading out the image data stored in the memory means (RAM).

After determining all the coordinates of centers of the data cells, a white-and-black pattern of the data cells is judged based on the image data (Step 400). Next, the cell-feature-conversion matrix pattern information 7 is read (Step 410). More specifically, the cell-feature-conversion matrix pattern is read out from the ROM, RAM or an external memory device not shown. Subsequently, an exclusive-OR is taken between the readout conversion matrix pattern and the data cell pattern judged in the step 400, thereby restoring the content of the data cells (Step 420).

Above-described steps 410 and 420 can be omitted when the cell features of the two-dimensional code is not converted.

Thereafter, the data region is divided into individual character cell groups (Step 430). It is needless to say that division is executed in accordance with the placement of character cell groups as shown in FIGS. 6A and 6B or FIGS. 12A and 12B.

Individual data involved in each character cell group are converted into a corresponding character (Step 440). Next, a judgement is made as to whether an error is detected based on the error-correcting code (Step 450). If any error is found, error correction of data is executed (Step 460). When no error is found in step 450 or after the error correction of data is finished, another judgement is made as to whether any error is found based on the error detecting code (i.e. CRC code) (Step 470). If no error is found, the procedure is terminated. If any error is found, the procedure returns to the step 300 to restart all the processing from the beginning.

Once the decoding of data from two-dimensional code is completed in this manner, the resultant data are transmitted to a host computer (not shown) wherein a predetermined control is executed based on these data.

According to the present invention, the positioning symbol assures that the same characteristic frequency component ratio will be obtained irrespective of the orientation of a straight scanning line. Hence, it is not necessary to repeat the scanning operation changing its scanning angle. Thus, in the matrix, at least two predetermined positions are quickly and easily detected. Once the positions of two predetermined positions are detected in the matrix, the position and a rotational angle of the whole matrix is easily calculated based on the distance and angle between them.

When the predetermined positions are apexes of the matrix, they will be immediately found in the scanning search, and are seldom disturbed by other code patterns when they are searched.

The shape of the matrix is generally a regular square or a rectangle. Thus, a preferable shape of the positioning symbol is a square or a rectangle since it fits to the shape of the matrix and the loss of space can be suppressed to a minimum level. Particularly, a square is most preferable since it assures the least loss.

When the matrix includes a series of light and dark cells alternately extending with an inclination 1/1, the number of cells used for the alternating light-and-dark cells can be fairly reduced. Thus, the remaining cells can be effectively used for available space for other useful information.

Furthermore, when the cell group representing one character is arranged in a two-dimensional pattern, such a two-dimensional arrangement is advantageous in that the number of characters becoming unreadable due to the presence of a stain having a predetermined area is minimized. Thus, it becomes possible to minimize the number of characters spoiled by the stain.

The data cells can be converted into a pattern discriminable from the characteristic patterns of the positioning symbols and the 1/1 inclined alternating light and-dark cells. This will facilitate the discrimination of the data cells from the positioning symbols and the 1/1 inclined alternating light-and-dark cells. Thus, processing will become simple and fast. Furthermore, when the matrix has a corner having no positioning symbol, detection of such a corner can be facilitated by disposing the apex detecting cell at that corner of the matrix.

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within the metes an bounds of the claims, or equivalents of such metes and bounds, are therefore intended to be embraced by the claims.

What is claimed is:

1. A two-dimensional code comprising:
    a plurality of cells, each of said plurality of cells representing a binary-coded datum;
    said plurality of cells forming a two-dimensional matrix pattern readable by a scanning operation along any arbitrary scanning lines; and
    at least three positioning symbols disposed at predetermined positions in said two-dimensional matrix pattern, at least two of said at least three positioning symbols having a pattern capable of gaining an identical frequency component ratio irrespective of an orientation of said any arbitrary scanning lines whenever said arbitrary scanning lines pass through a center of each of said at least three positioning symbols.

2. The two-dimensional code in accordance with claim 1, wherein:
    at least two of said at least three positioning symbols comprise respective apex cells of said two-dimensional matrix.

3. The two-dimensional code in accordance with claim 1, wherein:
    said two-dimensional matrix pattern comprises said at least three positioning symbols including concentric similar figures overlapped successively.

4. The two-dimensional code in accordance with claim 1, further comprising:
    a series of timing cells including light and dark cells alternately arrayed with an inclination of 1/1 in said two-dimensional matrix.

5. The two-dimensional code in accordance with claim 1, wherein:
    said binary-coded datum includes a plurality of characters, each of said plurality of characters being represented by a character cell group representing only one character disposed in a two-dimensional square region of said two-dimensional matrix, and said two-dimensional square region being defined by vertically stacked and horizontally arrayed ones of said plurality of cells.

6. The two-dimensional code in accordance with claim 1, further comprising:
    an apex detecting cell disposed on an apex of said two-dimensional matrix where said at least three positioning symbols are not disposed.

7. A two-dimensional code reading apparatus for optically reading a two-dimensional code including a plurality of binary-coded cells in a two-dimensional matrix pattern, said two-dimensional code including a symbol disposed in a vicinity of an apex of said two-dimensional matrix, said symbol having a specific pattern including concentric similar figures overlapped successively, said reading apparatus comprising:
    an image pickup device to take an image of said two-dimensional code to convert said image pixel by pixel into a resultant image signal in response to a light intensity of said image, and to successively output said resultant image signal; and
    a decoder unit to decode said resultant image signal into a binary-coded signal, said decoder unit comprising:
    binary-encoding means for binary encoding said resultant image signal in accordance with a level of said resultant image signal, and outputting said binary-coded signal successively;
    memory means for storing said binary-coded signal as image data in accordance with a position of a pixel where said image was taken;
    symbol detecting means for detecting said specific pattern corresponding to said symbol based on said binary-coded signal;
    apex detecting means for detecting coordinates of said symbol from said image data stored in said memory means based on said specific pattern detected by said symbol detecting means;
    matrix position determining means for finalizing a contour and an orientation of said two-dimensional matrix based on coordinates of said symbol detected by said apex detecting means, thereby identifying all coordinates of said plurality of binary-coded cells; and
    reading means for reading out said image data stored in said memory means in accordance with said finalized contour and said orientation of said two-dimensional matrix.

8. The two-dimensional code reading apparatus in accordance with claim 7, wherein:
    said plurality of binary-coded cells comprise a series of timing cells including light and dark cells alternately arrayed in said two-dimensional matrix, and optically readable by said image pickup device; and
    said decoder unit further comprises timing cell detecting means for detecting coordinates of each timing cell of said series of timing cells from said image data stored in said memory means in accordance with coordinates of said symbol obtained by said apex detecting means, said series of timing cells determining a cell position of said image data in accordance with intervals of said series of timing cells.

9. The two-dimensional code reading apparatus in accordance with claim 7, wherein:
    said two-dimensional code is created by performing an exclusive-OR operation between a predetermined provisional two-dimensional code and a two-dimensional cell-feature-conversion code which includes a specific conversion pattern represented by light cells and dark cells corresponding to a data region of said provisional two-dimensional code; and said reading means restores information of said provisional two-dimensional code by performing said exclusive-OR operation between said image data obtained from said image taken by said image pickup device and two-dimensional image data of said two-dimensional cell-feature-conversion code stored in said memory means.

10. A two-dimensional code reading method for optically reading a two-dimensional code including binary-coded cells placed in a two-dimensional matrix pattern, comprising steps of:

disposing a symbol in a vicinity of an apex of said two-dimensional matrix, said symbol having a specific pattern including concentric similar figures overlapped successively;

taking an image of said two-dimensional code by an image pickup device, converting said image pixel by pixel into an image signal in response to a light intensity of said image, binary encoding said image signal in accordance with a level of said image signal, and storing a resultant binary-coded signal as image data in memory means in accordance with a position of a pixel where said image was taken;

detecting said specific pattern corresponding to said symbol based on said resultant binary-coded signal in parallel with storage of said binary-coded signal in said memory means;

detecting coordinates of said symbol from said image data stored in said memory means based on said detected specific pattern;

finalizing a contour and an orientation of said two-dimensional matrix based on coordinates of said symbol, thereby identifying all coordinates of said binary-coded cells; and reading out said image data stored in said memory means in accordance with said finalized contour and said orientation of said two-dimensional matrix.

11. A two-dimensional code comprising:

a plurality of cells, each of said plurality of cells representing a binary-coded datum;

said plurality of cells forming a two-dimensional matrix pattern readable by a scanning operation along scanning lines; and timing cells arrayed in said two-dimensional matrix, said timing cells including light and dark cells arrayed alternately with an inclination of 1/1.

12. The two-dimensional code in accordance with claim 11, further comprising:

at least two positioning symbols disposed at predetermined positions in said two-dimensional matrix, each of said at least two positioning symbols having a pattern capable of gaining an identical frequency component ratio irrespective of an orientation of said scanning lines when said scanning lines pass through a center of each of said at least two positioning symbols.

13. A two-dimensional code comprising:

a plurality of cells, each of said plurality of cells representing a binary-coded datum;

said plurality of cells forming a two-dimensional matrix pattern and being readable by a scanning operation along scanning lines;

a two-dimensional code being created by operation of an exclusive-ORing between a predetermined provisional two-dimensional code and a two-dimensional cell-feature-conversion code which includes a specific conversion pattern.

14. The two-dimensional code in accordance with claim 13, wherein said specific conversion pattern comprises:

light and dark cells; and said exclusive-Oring is operated in a cell by cell manner between said predetermined provisional two-dimensional code and said two-dimensional cell-feature-conversion code.

15. A two-dimensional code formed from a two-dimensional matrix having a plurality of binary-coded cells, said two-dimensional code comprising:

total symbol cells representing an orientation of said two-dimensional matrix;

said total symbol cells forming a two-dimensional matrix pattern and being readable by a scanning operation along scanning lines; and at least one data cell group, each of said at least one data cell group comprising a group of said plurality of binary-coded cells, each of said at least one data cell group representing only one character and being disposed in a two-dimensional n×m square region in said two-dimensional matrix, said two-dimensional n×m square region being defined by vertically stacked binary-coded cells and horizontally arrayed binary-coded cells, in which said n is a number of said vertically stacked binary-coded cells and said m is a number of said horizontally arrayed binary-coded cells.

16. The two-dimensional code in accordance with claim 15, wherein:

said two-dimensional matrix is a square matrix; and said total symbol cells are comprised of a plurality of symbol cells disposed at apex positions in said square matrix, said symbol cells having a same pattern capable of gaining a same identical frequency component ratio irrespective of an orientation of said arbitrary scanning lines whenever said scanning lines pass through a center of said two-dimensional pattern.

17. A two-dimensional code comprising:

a plurality of cells, each of said plurality of cells representing a binary-coded datum;

said plurality of cells being placed on a two-dimensional matrix, said two-dimensional matrix having a square shape and being enclosed by straight peripheral lines so as to form a pattern readable by a scanning operation along any arbitrary scanning lines;

at least two positioning symbols disposed at apex positions in said two-dimensional matrix, each of said at least two positioning symbols having a pattern capable of gaining an identical frequency component ratio irrespective of an orientation of said arbitrary scanning lines whenever said arbitrary scanning lines pass through a center of each of said at least two positioning symbols, said at least two positioning symbols being square in shape and having straight peripheral lines parallel to said straight peripheral lines of said two-dimensional matrix; and said plurality of cells being processed through a predetermined conversion processing into a characteristic pattern different from said pattern of said positioning symbols.

18. The two-dimensional code in accordance with claim 17, wherein said positioning symbols are disposed at three of four corners of said two-dimensional code and characterized by a pattern consisting of a large square of black cells, a middle square of white cells concentric with but smaller in size than said large square, and a small square of black cells concentric with but smaller in size than said middle square.

19. The two-dimensional code in accordance with claim 18, wherein an apex detecting cell is located at a remaining corner of said two-dimensional code, said remaining corner not having said positioning symbol disposed therein.

20. The two-dimensional code in accordance with claim 19, wherein said apex detecting cell comprises a single square cell.

21. A two-dimensional code formed on a two-dimensional matrix comprising:

at least two positioning symbols disposed at predetermined positions in said two-dimensional matrix, each of said at least two positioning symbols having a pattern capable of gaining an identical frequency component ratio obtainable from any arbitrary scanning line passing through a center of said positioning symbol, said frequency component ratio being defined as dark:light:dark:light:dark=1:1:3:1:1, irrespective of an orientation of said arbitrary scanning line whenever said arbitrary scanning line passes through said center of said positioning symbol; and a plurality of data cells, each of said plurality of data cells representing a binary-coded datum, said plurality of data cells being placed on said two-dimensional matrix pattern being readable by any scanning operation along said arbitrary scanning line, said plurality of data cells being processed by predetermined conversion processing into a characteristic pattern different from said pattern of said at least two positioning symbols.

22. The two-dimensional code in accordance with claim 5, wherein said square region is a regular square consisting of n×n cells, where n is a positive integer.

23. A two-dimensional code reading apparatus for optically reading a two-dimensional code including a plurality of binary-coded cells placed on a two-dimensional square matrix pattern, said two-dimensional code including an orientation symbol and timing cells, said orientation symbol being disposed in a peripheral region of said two-dimensional square matrix pattern and comprising three apexes of said two-dimensional square matrix pattern, said reading apparatus comprising:

an image pickup device to take an image of said two-dimensional code, to convert said image pixel by pixel into an image signal in response to a light intensity of said image, and successively outputting said image signal; and a decoder unit for decoding said image signal into a plurality of binary-coded signals;

wherein said decoder unit comprises:

binary-encoding means for binary encoding said image signal in accordance with a level of said image signal, and outputting said plurality of binary-coded signals successively;

memory means for storing said plurality of binary-coded signals as image data in accordance with a position of a pixel where the image was taken;

symbol detecting means for detecting a specific pattern corresponding to said orientation symbol based on said plurality of binary-coded signals;

apex and timing cell detecting means for detecting coordinates of said three apexes of said orientation symbol and coordinates of said timing cells from said image data stored in said memory means based on said specific pattern detected by said symbol detecting means;

matrix position determining means for finalizing a contour and an orientation of said two-dimensional square matrix based on the coordinates of said orientation symbol detected by said apex and timing cell detecting means, and identifying all coordinates of said plurality of binary-coded cells placed on said two-dimensional square matrix pattern with reference to said coordinates of said timing cells; and reading means for reading out said image data stored in said memory means in accordance with the finalized contour and said orientation of said two-dimensional square matrix pattern.

24. A two-dimensional code reading apparatus for optically reading a two-dimensional code including a plurality of binary-coded cells placed on a two-dimensional square matrix pattern, said two-dimensional code including timing cells and total symbol cells, said total symbol cells representing an orientation symbol and being disposed in a peripheral region of said two-dimensional matrix pattern and comprising a plurality of separate apex cells, said reading apparatus comprising:

an image pickup device to take an image of said two-dimensional code, to convert said image pixel by pixel into an image signal in response to a light intensity of said image, and successively outputting said image signal; and a decoder unit for decoding said resultant image signals into a plurality of binary-coded signals;

wherein said decoder unit comprises:

binary-encoding means for binary encoding said image signal in accordance with a level of said image signal, and outputting said plurality of binary-coded signals successively;

memory means for storing said plurality of binary-coded signals as image data in accordance with a position of a pixel where the image was taken;

symbol detecting means for detecting a specific pattern corresponding to said total symbol cells based on said plurality of binary-coded signals;

apex and timing cell detecting means for detecting coordinates of said timing cells and coordinates of each of said plurality of separate apex cells comprised by said total symbol cells;

matrix position determining means for finalizing a contour and an orientation of said two-dimensional square matrix pattern based on the coordinates of said plurality of said separate apex cells detected by said apex and timing cell detecting means, and identifying all coordinates of said plurality of binary-coded cells placed on said two-dimensional square matrix pattern with reference to said coordinates of said timing cells; and reading means for reading out said image data stored in said memory means in accordance with said finalized contour and said orientation of said two-dimensional square matrix pattern.

25. The two-dimensional code reading apparatus in accordance with claim 24, wherein said two-dimensional code further includes an apex detecting cell having a predetermined binary-coded value at a portion of said two-dimensional code having none of said total symbol cells disposed, and said apex and timing cell detecting means further detects said apex detecting cell according to said detected coordinates of said plurality of separate apex cells.

26. The two-dimensional code reading apparatus in accordance with claim 24, wherein:

said apex and timing cell detecting means detects said coordinates of said separate plurality of apex cells and coordinates of a remaining apex cell of said two-dimensional square matrix, and said total symbol cells are a plurality of separate symbol cells.

27. The two-dimensional code reading apparatus in accordance with claim 26, wherein said coordinates of said remaining apex cell $X_0$, $Y_0$) is defined by the following equation:

$$X_0 = x_0 + (x_2 - x_1)$$
$$Y_0 = y_0 + (y_2 - y_1)$$

where $(x_0, y_0)$, $(x_1, y_1)$, and $(x_2, y_2)$ represent said coordinates of each of said plurality of separate apex cells.

28. The two-dimensional code reading apparatus in accordance with claim 25, wherein said apex and timing cell detecting means detects said apex detecting cell by searching a vicinity of a candidate coordinate position calculated using said detected coordinates of said plurality of separate apex cells.

29. The two-dimensional code in accordance with claim 15, wherein said plurality of binary-coded cells in said two-dimensional n×m square region comprise a plurality of bits dedicated to data of said one character and one of said plurality of bits dedicated to a parity.

30. A two-dimensional code reading apparatus for optically reading a two-dimensional code including a plurality of white binary-coded cells and a plurality of black binary-coded cells in a two-dimensional matrix pattern, said plurality of white binary-coded cells and said plurality of black binary-coded cells comprising dummy cells in a data region so as to prevent one of said plurality of white binary-coded cells and said plurality of black binary-coded cells from being consecutively and extensively arrayed, said two-dimensional code comprising an orientation symbol disposed in a peripheral region of said two-dimensional matrix, said reading apparatus comprising:

an image pickup device to take an image of said two-dimensional code, to convert said image pixel by pixel into an image signal in response to a light intensity of said image, and successively outputting said image signal; and an encoder unit for encoding said image signal into a plurality of binary-coded signals;

wherein said encoder unit comprises:

binary-encoding means for binary encoding said image signal in accordance with a level of said image signal, and outputting said plurality of binary-coded signals successively, said binary-encoding means comprising:

a comparator means for comparing a white level and a black level of an input waveform representing said image signal with a follow-up waveform which approaches one of said white level and said black level of said input waveform when one of said plurality of white binary-coded cells and said plurality of black binary-coded cells are so consecutively and extensively arrayed;

memory means for storing said binary-coded signals as image data in accordance with a position of a pixel where the image was taken;

symbol detecting means for detecting a specific pattern corresponding to said orientation symbol based on said binary-coded signals;

apex detecting means for detecting coordinates of said orientation symbol from said image data stored in said memory means based on said specific pattern detected by said symbol detecting means;

matrix position determining means for finalizing a contour and an orientation of said two-dimensional matrix based on the coordinates of said symbol detected by said apex detecting means, thereby identifying all the coordinates of said plurality of binary-coded cells placed on said two-dimensional matrix; and reading means for reading out said image data stored in said memory means in accordance with said finalized contour and said orientation of said two-dimensional square matrix.

31. A two-dimensional code reading apparatus for optically reading a two-dimensional code including a plurality of white binary-coded cells and a plurality of black binary-coded cells placed on a two-dimensional matrix pattern, said two-dimensional code created by an operation of exclusive-ORing between a predetermined provisional two-dimensional code and a two-dimensional cell-feature-conversion code including a specific conversion pattern represented by light cells and dark cells so as to prevent said one of said plurality of white binary-encoded cells and said plurality of black binary-coded cells from being consecutively and extensively arrayed, said two-dimensional code comprising an orientation symbol disposed in a peripheral region of said two-dimensional matrix, said reading apparatus comprising:

an image pickup device taking an image of said two-dimensional code, to convert said image pixel by pixel into an image signal in response to a light intensity of said image, and successively outputting said image signal; and an encoder unit encoding said image signal into a plurality of binary-coded signals;

wherein said encoder unit comprises:

binary-encoding means for binary encoding said image signal in accordance with a level of said image signal, and outputting said plurality of binary-coded signals successively, said binary-encoding means comprising a comparator means for comparing a white level and a black level of an input waveform representing said image signal with a follow-up waveform which approaches one of said white level and said black level of said input waveform when one of said plurality of white binary-coded cells and said plurality of black binary-coded cells is so consecutively and extensively arrayed;

memory means for storing said plurality of binary-coded signals as image data in accordance with a position of a pixel where the image was taken;

symbol detecting means for detecting a specific pattern corresponding to said orientation symbol based on said plurality of binary-coded signals;

apex detecting means for detecting coordinates of said orientation symbol from said image data stored in said memory means based on said specific pattern detected by said symbol detecting means;

matrix position determining means for finalizing a contour and an orientation of said two-dimensional matrix based on the coordinates of said orientation symbol detected by said apex detecting means, thereby identifying all coordinates of said plurality of binary-coded cells in said two-dimensional matrix; and reading means for reading out said image data stored in said memory means in accordance with the finalized contour and said orientation of said two-dimensional matrix, said reading means restoring information of said two-dimensional code by said operation of exclusive-ORing between said image data obtained from said image taken by said image pickup device and image data of said two-dimensional cell-feature-conversion code stored in said memory means.

32. The two-dimensional code reading apparatus in accordance with claim 9, wherein an orientation symbol comprises three of said symbols, one of said symbols has a predetermined frequency component ratio, and said operation of exclusive-ORing being executed to prevent said plurality of binary-coded cells other than said orientation symbol from having a frequency component ratio being one of identical to said frequency component ratio of said one of said symbols and similar to said frequency component ratio of said one of said symbols.

33. The two-dimensional code reading apparatus in accordance with claim 31, wherein said two-dimensional code stores information data indicating a type of said two-dimensional cell-feature-conversion code used for said operation of exclusive-ORing.

34. The two-dimensional code in accordance with claim 5, wherein said two-dimensional code has a code-reading-prohibition cell to prohibit an operation of reading said two-dimensional code when said code-reading-prohibition cell is a predetermined color.

35. The two-dimensional code in accordance with claim 15, wherein said two-dimensional code has a code-reading-prohibition cell to prohibit an operation of reading said two-dimensional code when said code-reading-prohibition cell is a predetermined color.

36. The two-dimensional code reading apparatus in accordance with claim 23, wherein said two-dimensional code includes a code-reading-prohibition cell, and said reading apparatus further comprises a reading operation prohibition means for prohibiting an operation of optically reading said two-dimensional code when said code-reading-prohibition cell is a predetermined color.

37. The two-dimensional code reading apparatus in accordance with claim 36, wherein:
   said plurality of binary-coded cells cooperatively represent a plurality of characters, a group of said plurality of binary-coded cells being disposed in a two-dimensional square region of said two-dimensional square matrix being allocated to only one character of said plurality of characters, and
   said square region being defined by vertically stacked and horizontally arrayed ones of said plurality of binary-coded cells.

38. The two-dimensional code reading apparatus in accordance with claim 37, wherein said two-dimensional square region is a regular square consisting of n×n cells, where n is a positive integer.

39. The two-dimensional code reading apparatus in accordance with claim 23, wherein said plurality of binary-coded cells include an error-correcting code to restore a predetermined data region when said predetermined data region is one of contaminated by a stain and otherwise damaged.

40. The two-dimensional code reading apparatus in accordance with claim 39, wherein:
   said two-dimensional code has a code-reading-prohibition cell, and
   said reading apparatus further comprises a reading operation prohibition means for prohibiting an optical reading operation of said two-dimensional code when said code-reading-prohibition cell is a predetermined color.

41. A two-dimensional code formed as a two-dimensional matrix including a plurality of binary-coded cells, comprising:
   total symbol cells representing an orientation of said two-dimensional matrix, said total symbol cells on said two-dimensional matrix pattern to be readable by a scanning operation along scanning lines;
   a plurality of data cells, each of said plurality of data cells comprising a group of said plurality of binary-coded cells, each of said plurality of data cells representing only one character and disposed in a two-dimensional square region in said two-dimensional matrix;
   an error-correcting code to restore a predetermined data region when said predetermined data region is one of contaminated by a stain and otherwise damaged; and
   a code-reading-prohibition cell to prohibit a reading operation of said two-dimensional code when a code-reading-prohibition cell disposed within said two-dimensional code is a predetermined color.

42. A two-dimensional code formed as a two-dimensional matrix having a plurality of binary-coded cells, comprising:
   total symbol cells representing an orientation of said two-dimensional matrix, said total symbol cells being placed on said two-dimensional matrix pattern and readable by a scanning operation along scanning lines; and
   a plurality of data cells, each of said plurality of data cells comprising a group of said plurality of binary-coded cells being disposed in a two-dimensional region of said two-dimensional matrix, each of said plurality of data cells representing only one character; and
   dummy black lines having an optimal placement pattern to distinguish said total symbol cells from said plurality of data cells.

43. A two-dimensional code formed as a two-dimensional matrix having a plurality of binary-coded cells, comprising:
   total symbol cells representing an orientation of said two-dimensional matrix, said total symbol cells on said two-dimensional matrix forming a pattern readable by a scanning operation along scanning lines; and
   a plurality of data cells, each of said plurality of data cells comprising a group of said plurality of binary-coded cells, each of said plurality of data cells representing only one character and disposed in a two-dimensional region in said two-dimensional matrix, said plurality of data cells having an optimum placement pattern of said plurality of binary-coded cells, said optimum placement pattern being created by an operation of exclusive-ORing between a predetermined provisional two-dimensional code and a two-dimensional cell-feature-conversion code including a specific conversion pattern, whereby said plurality of data cells are distinguished from said pattern of said total symbol cells.

44. The two-dimensional code in accordance with claim 43, wherein a subset of said total symbol cells form a positioning symbol which is capable of gaining an identical frequency component ratio whenever one of said scanning lines passes through a center of said positioning symbol formed by said subset of said total symbol cells and said optimum placement pattern does not have a frequency component ratio being one of identical to a frequency component ratio of said pattern of said positioning symbol and similar to said frequency component ratio of said pattern of said positioning symbol.

45. A two-dimensional code reading method for optically reading a two-dimensional code including a plurality of binary-coded cells placed on a two-dimensional square matrix pattern, said two-dimensional square matrix pattern comprising an orientation symbol and timing cells, said orientation symbol being disposed in a peripheral region of said two-dimensional square matrix pattern as a specific pattern and including three apexes of said two-dimensional square matrix pattern, comprising steps of:

- taking an image of said two-dimensional code by an image pickup device, then converting said image pixel by pixel into an image signal in response to a light intensity of said image, and binary encoding said image signal in accordance with a level of said image signal, then storing a plurality of binary-coded signals as image data in a memory in accordance with a position of a pixel where the image was taken;
- detecting said specific pattern corresponding to said orientation symbol based on said plurality of binary-coded signals;
- detecting coordinates of said three apexes of said orientation symbol and coordinates of said timing cells from said image data stored in said memory based on the detected specific pattern;
- finalizing a contour and an orientation of said two-dimensional matrix based on the coordinates of said orientation symbol, thereby identifying coordinates of said plurality of binary-coded cells placed on said two-dimensional matrix pattern; and
- reading out said image data stored in said memory in accordance with the finalized contour and said orientation of said two-dimensional square matrix pattern.

46. A two-dimensional code printing method for optically printing a two-dimensional code including a plurality of binary-coded cells placed on a two-dimensional matrix pattern, said two-dimensional matrix pattern comprising an orientation symbol disposed in a peripheral region of said two-dimensional matrix pattern as a specific pattern, comprising steps of:

- setting objective data in a work memory;
- binary encoding each of said objective data into one of "0" and "1";
- arranging said encoded objective data in a two-dimensional data pattern according to a predetermined rule;
- performing an operation of exclusive-ORing between said two-dimensional data pattern and each of a plurality of cell-feature-conversion matrix patterns prepared beforehand, to obtain placement patterns;
- selecting an optimum placement pattern from said placement patterns;
- placing said selected optimum placement pattern in said two-dimensional code; and
- printing said two-dimensional code by a printing device.

47. A two-dimensional code reading method for optically reading a two-dimensional code including a plurality of binary-coded cells placed on a two-dimensional matrix, said two-dimensional matrix comprising an orientation symbol disposed in a peripheral region of said two-dimensional matrix as a specific pattern, comprising steps of:

- taking an image of said two-dimensional code by an image pickup device;
- converting said image pixel by pixel into an image signal in response to a light intensity of said image;
- binary encoding said image signal in accordance with a level of said image signal, thereby successively producing a plurality of binary-coded signals;
- executing storing processing while performing detecting processing in parallel, wherein said storing processing successively stores said plurality of binary-coded signals into a memory as image data while said detecting processing detects said specific pattern corresponding to said orientation symbol based on said plurality of binary-coded signals;
- finalizing a contour and an orientation of said two-dimensional matrix based on coordinates of said plurality of binary-coded cells on said two-dimensional matrix; and
- reading out said image data stored in said memory in accordance with said finalized contour and said orientation of said two-dimensional matrix.

48. The two-dimensional code in accordance with claim 46, further comprising a step of adding an error-correcting code to said encoded objective data.

49. The two-dimensional code reading method in accordance with claim 45, further comprising steps of:

- reading out one cell-feature-conversion matrix pattern prepared beforehand;
- performing an operation of exclusive-ORing between said readout one cell-feature-conversion matrix pattern and said image data stored in said memory, and storing an obtained exclusive-OR result; and
- dividing a data region of said obtained exclusive-OR result into a plurality of individual character cell groups, and converting each of said plurality of individual character cell groups into a corresponding character.

50. The two-dimensional code reading method in accordance with claim 49, wherein said two-dimensional code includes an error-correcting code, and said two-dimensional code reading method further comprises a step of making a judgment based on said error-correcting code as to whether an error exists after converting each of said plurality of individual character cell groups to said corresponding character, and executing an error correction of said corresponding character when said error is found.

51. A two-dimensional code reading method for optically reading a two-dimensional code including a plurality of binary-coded cells on a two-dimensional square matrix pattern, said two-dimensional square matrix pattern comprising an orientation symbol and timing cells, said orientation symbol comprising a plurality of apex cells of said two-dimensional square matrix pattern, said two-dimensional code reading method comprising steps of:

- taking an image of said two-dimensional code by an image pickup device, then converting said image pixel by pixel into an image signal in response to a light intensity of said image, and binary encoding said image signal in accordance with a level of said image signal, then storing a plurality of binary-coded signals as image data in a memory in accordance with a position of a pixel where the image was taken;
- detecting a specific pattern corresponding to said orientation symbol based on said plurality of binary-coded signals;
- detecting coordinates of each one of said plurality of apex cells comprised by said orientation symbol, and coordinates of said timing cells from said image data stored in said memory based on said detection of said specific pattern;
- finalizing a contour and an orientation of said two-dimensional matrix based on said detected specific pattern and said coordinates of said plurality of apex cells, and identifying coordinates of said plurality of binary-coded cells placed on said two-dimensional square matrix pattern with reference to said coordinates of said timing cells; and reading out said image data stored in said memory in accordance with said finalized contour and said orientation of said two-dimensional square matrix pattern.

52. The two-dimensional code reading method in accordance with claim 51, wherein said step of detecting coordinates further comprises calculating coordinates of an intended apex cell ($X_0$, $Y_0$) using equations:

$$X_0 = x_0 + (x_2 - x_1)$$

$$Y_0 = y_0 + (y_2 - y_1)$$

where ($x_0$, $y_0$), ($x_1$, $y_1$), and ($x_2$, $y_2$) represent said coordinates of three of said plurality of apex cells of said two-dimensional square matrix pattern other than said intended apex cell.

53. The two-dimensional code reading method in accordance with claim 45, wherein:

each of said three apexes is disposed at a separate corner of said two-dimensional square matrix pattern, each of said three apexes comprising an apex cell, said two-dimensional square matrix comprises an apex detecting cell at a remaining corner of said two-dimensional square matrix pattern, and said step of detecting coordinates includes detecting coordinates of each of said apex cells and further detects said apex detecting cell by searching a vicinity of coordinates of said remaining corner obtainable from said coordinates of each of said apex cells.

54. A two-dimensional code comprising:

a plurality of cells, each of said plurality of cells representing a binary-coded datum, said plurality of cells on a two-dimensional matrix pattern readable by a scanning operation along scanning lines;

at least two positioning symbols disposed at predetermined positions in said two-dimensional matrix pattern, each of said at least two positioning symbols having a pattern capable of gaining an identical frequency component ratio irrespective of an orientation of said scanning lines when said scanning lines pass through a center of each of said at least two positioning symbols; and a series of timing cells including light and dark cells alternately arrayed with an inclination of 1/1 in said two-dimensional matrix pattern.

55. A two-dimensional code comprising:

a plurality of cells, each of said plurality of cells representing a binary-coded datum, said plurality of cells on a two-dimensional matrix pattern readable by a scanning operation along scanning lines;

at least two positioning symbols disposed at predetermined positions in said two-dimensional matrix pattern, each of said at least two positioning symbols having a pattern capable of gaining an identical frequency component ratio irrespective of an orientation of said scanning lines when said scanning lines pass through a center of each of said at least two positioning symbols; and an apex detecting cell disposed on an apex of said two-dimensional matrix pattern where said at least two positioning symbols are not disposed.

56. A two-dimensional code comprising:

a plurality of cells, each of said plurality of cells representing a binary-coded datum, said plurality of cells being placed on a two-dimensional matrix pattern readable by any scanning operation along arbitrary scanning lines; and at least two positioning symbols disposed at predetermined positions in said two-dimensional matrix pattern, each of said at least two positioning symbols having a pattern capable of gaining an identical frequency component ratio irrespective of an orientation of said arbitrary scanning lines whenever said arbitrary scanning lines pass through a center of each of said at least two positioning symbols.

57. The two-dimensional code in accordance with claim 56, wherein:

each of said at least two positioning symbols includes a pattern including concentric similar figures overlapped successively.

58. A two-dimensional code comprising:

a plurality of cells, each of said plurality of cells representing a binary-coded datum;

said plurality of cells being placed on a two-dimensional matrix, said two-dimensional matrix having a square shape and being enclosed by straight peripheral lines so as to form a pattern readable by a scanning operation along any arbitrary scanning lines;

at least two positioning symbols disposed at apex positions in said two-dimensional matrix, each of said at least two positioning symbols having a pattern capable of gaining an identical frequency component ratio irrespective of an orientation of said arbitrary scanning line whenever said arbitrary scanning lines pass through a center of each of said at least two positioning symbols, said at least two positioning symbols being square in shape and having straight peripheral lines parallel to said straight peripheral lines of said two-dimensional matrix.

59. A two-dimensional code formed from a two-dimensional matrix having a plurality of binary-coded cells, said two-dimensional code comprising:

a plurality of symbol cells representing an orientation of said two-dimensional matrix;

said plurality of symbol cells forming a two-dimensional matrix pattern and being readable by a scanning operation along any arbitrary scanning lines, said pattern being capable of gaining an identical frequency component ratio irrespective of an orientation of said arbitrary scanning lines whenever said arbitrary scanning lines pass through a center of said pattern; and at least one data cell group comprising a group of said plurality of binary-coded cells, each of said at least one data cell group representing only one character and being disposed in a two-dimensional square region in said two-dimensional matrix, said two-dimensional square region being defined by vertically stacked binary-coded cells and horizontally arrayed binary-coded cells.

60. The two-dimensional code in accordance with claim 59, wherein said plurality of binary-coded cells in said two-dimensional square region comprise a plurality of bits dedicated to data of said one character and one of said plurality of bits dedicated to a parity.

61. The two-dimensional code in accordance with claim 59, wherein said two-dimensional code has a code-reading-prohibition cell to prohibit an operation of reading said two-dimensional code when said code-reading-prohibition cell is a predetermined color.

* * * * *

UNITED STATES PATENT AND TRADEMARK OFFICE
CERTIFICATE OF CORRECTION

PATENT NO. : 5,726,435
DATED : March 10, 1998
INVENTOR(S) : Masahiro HARA; Motoaki WATABE; Takayuki NAGAYA; Yuji UCHIYAMA It is certified that error appears in the above-identified patent and that said Letters Patent is hereby corrected as shown below:

TITLE PAGE

Please add:  Foreign Application Priority Data:

--[30]  Japan [JP].....March 14, 1994.......6-42587--

Signed and Sealed this

Sixteenth Day of March, 1999

Attest:

Q. TODD DICKINSON

Attesting Officer

Acting Commissioner of Patents and Trademarks